United States Patent [19]
Kimmel

[11] Patent Number: 6,031,935
[45] Date of Patent: Feb. 29, 2000

[54] METHOD AND APPARATUS FOR SEGMENTING IMAGES USING CONSTANT-TIME DEFORMABLE CONTOURS

[76] Inventor: Zebadiah M. Kimmel, 105 S. Wright St., #203, Champaign, Ill. 61820

[21] Appl. No.: 09/022,870

[22] Filed: Feb. 12, 1998

[51] Int. Cl.[7] .................................................. G06K 9/34
[52] U.S. Cl. ...................... 382/173; 170/199; 170/203; 170/286; 170/288
[58] Field of Search ................................ 382/173, 170, 382/199, 203, 286, 288, 295, 296

[56] References Cited

U.S. PATENT DOCUMENTS

| | | | |
|---|---|---|---|
| 4,910,786 | 3/1990 | Eichel | 382/199 |
| 5,559,901 | 9/1996 | Lobregt | 382/256 |
| 5,768,413 | 6/1998 | Levin et al. | 382/173 |
| 5,832,116 | 11/1998 | Rezzouk | 382/199 |

OTHER PUBLICATIONS

Staib and Duncan, *Boundary Finding with Parametrically Deformable Models,* IEEE Transactions of Pattern Analysis and Machine Intelligence, vol. 14, No. 11, Nov. 1992, pp. 1061–1075.

Storvik, *A Bayesian Approach to Dynamic Contours through Stochastic Sampling and Stimulated Annealing,* IEEE Transactions of Pattern Analysis and Machine Intelligence, vol. 16, No. 10, Oct. 1994, pp. 976–986.

Malladi, Sethian, and Vemuri, *Shape Modeling with Front Propagation A Level Set Approach,* IEEE Transactions of Pattern Analysis and Machine Intelligence, vol. 17, No. 2, Feb. 1995, pp. 158–175.

Grzeszczuk and Levin, *"Brownian Strings": segmenting images with stochastically deformable contours,* Department of Radiology, University of Chicago, Chicago, Illinois, vol. 15.6, May 1997, pp. 1–37.

*Primary Examiner*—Phuoc Tran
*Attorney, Agent, or Firm*—Welsh & Katz, Ltd.

[57] ABSTRACT

An image segmentation system uses deformable contours to automatically identify the border of a target object in each image of a set of images. The majority of contour deformations, or moves, are performed in O(1) time. Each contour uses both global and local geometric information and pixel intensity information extracted from a training contour, as well as a priori domain knowledge, to find the outline of the target object.

24 Claims, 22 Drawing Sheets

METHOD AND APPARATUS FOR SEGMENTING IMAGES USING CONSTANT-TIME DEFORMABLE CONTOURS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates to the identification of regions, or objects of interest, in images. The term "image segmentation" refers to the process of identifying regions, or objects of interest, in pictures or images. For example, in a photograph depicting a vacation, potentially desirable segmentations would identify any or all forms of a person, a dog, a frisbee, a tree, and the like. Many methods for performing image segmentations have been developed, ranging from "fuzzy" methods based on theories from the field of artificial intelligence, to mathematically sophisticated methods involving intensity spectra and polynomial fitting.

Generally, segmentation methods fall into one of two categories, namely, fully-automatic segmentation and semi-automatic segmentation. Fully-automatic segmentation methods do not require any human input to perform their task, whereas semi-automatic segmentation methods require minimal help from a human. Segmentation methods may also be classified as wide-ranging or narrow-ranging, where wide-ranging methods are designed to detect many different types of regions or objects, while narrow-ranging methods are specific to a particular task.

Many schemes have been proposed for image segmentation. U.S. Pat. No. 5,048,095 issued to Bir et al. discusses a method of segmentation using a genetic algorithm. The genetic algorithm searches for a collection of parameters that allow an accompanying image segmenter to perform successfully. However, the outcome of the segmentation thus depends on the quality of the image segmenter, and the nature and design of the segmenter is not specified in the reference. Thus, the patent really begs the question of how to perform image segmentation.

U.S. Pat. Nos. 5,458,126 and 5,433,199, issued to Cline et al. discuss a method of identifying cardiac chambers using bivariate statistical distributions that are based on gradients or magnitudes of spatial changes in the images under consideration. The distributions are used to connect pixels together into presumed collections of identical tissue. This method is necessarily highly sensitive to noise and image imperfections, and is specific to the cardiac domain.

An article entitled "Snakes: Active contour models," International Journal of Computer Vision, pp. 321–331, 1988, by Kass, Witkin, and Terzopoulos, discloses a method that models contours as continuity-constrained spline curves with concomitant energy terms. These curves are called "active contours" or often "snakes." The active contour presumably fits a target border best when the energy terms are minimized. However, active contours are generally highly sensitive to initial conditions, parameters, and the particular energy minimization algorithms used. In addition, active contours do not work well in situations where spline curves do not function well, for example, where sharp corners exist.

U.S. Pat. No. 5,239,591 issued to Ranganath discusses a method for using propagated "seed contours" to segment the endocardial border. This method, based on active contours, suffers from all of the drawbacks described in the previous paragraph. Furthermore, the endocardial border problem is not a particularly challenging problem for known methods of segmentation, since it typically shows very high contrast.

An article entitled "Shape Modeling with Front Propagation: A Level Set Approach," IEEE Transactions on Pattern Analysis and Machine Intelligence, Vol 17, No 2, February 1995, by Sethian, Malladi, and Vemuri discloses using a closed hypersurface $\psi$ to model shapes; that is, the shape of a target object at some point in time corresponds to a curve $\psi=0$. This method is computationally expensive, embodies a number of limiting assumptions (most importantly, that the shape in question can be modeled as a propagating solid/liquid interface), and is highly sensitive to parameters.

R. P. Grzeszczuk and D. N. Levin, in an article entitled, "'Brownian Strings': Segmenting Images with Stochastically Deformable Contours," IEEE Trans on PAMI, Vol. 19, 1100–1114 (1997) describe the use of simulated annealing on a contour described by inter-pixel cracks, rather than active contours. This method suffers from sensitivity to particular energy terms, and parameters, such as temperature and annealing time, and because it seeks a global energy minimum, it is easily led astray.

All prior art methods of image segmentation methods suffer from one of more of the following disadvantages such as:

a) known methods may rely on purely statistical information, and devalue geometric or domain knowledge;

b) known methods may rely on global information, and devalue regional variation in a target or its outline;

c) known methods may seek a global energy minimum, which is an inherently non-robust and an error-prone process;

d) known methods may use mathematically sophisticated algorithms that are sensitive to image quality, noise, parameters, etc., and which require large amounts of calculation time;

e) known methods may use poor or poorly optimized algorithms;

f) known methods may be restricted to particular problem domains, or to "toy" problems which have little or no practical value;

g) known methods may use mathematical models which have no relation to the problem being attacked (i.e. balloons, splines, liquid/solid interfaces).

Accordingly, it is an object of the present invention to provide a novel apparatus and method for segmenting images to substantially overcome the above-described problems.

It is an object of the present inventive method to provide a method and apparatus of image segmentation (a "segmenter") that employs a combination of image intensity information, user-supplied information, and a priori domain knowledge information particular to the type of problem at hand, to segment images with a high degree of accuracy.

It is another object of the present inventive method to provide an image segmenter that minimizes the requisite amounts of user-supplied and a priori information.

It is a further object of the present inventive method to provide an image segmenter that is easily modified to operate successfully on many problems and domains, and which minimizes the amount of time and effort to enact such modifications.

It is also an object of the present inventive method to provide an image segmenter that operates extremely quickly and is computationally efficient.

SUMMARY

The disadvantages of the known image segmentation methods are substantially overcome with the present inventive method. The present inventive method includes the following advantages, which are not intended to comprise an exhaustive list:

a) it is applicable to many different problem domains, as opposed to other known methods which work only for certain applications, or under highly restricted conditions.

b) it does not rely on high-precision or mathematically complicated techniques, such as polynomial fitting, global energy minimization, probability distributions, and the like. Therefore it is not easily fooled by factors such as noise or local pixel intensity irregularities, which are fatal to other known methods.

c) it runs very quickly because it relies mainly on integer rather than floating-point arithmetic, and utilizes efficient and optimized routines.

d) it may simultaneously utilize different types of information (statistical, geometric, a priori, etc.), both locally and globally.

e) it does not use artificial and limiting shape models, such as snakes or level sets.

f) it functions well with real world problems.

g) its accuracy is easily improved by providing it with additional training contours.

There are many useful applications of such a high-quality segmenting method. The following recitation of useful applications is not intended to be an exhaustive list, but merely points out the wide and divergent fields in which the present inventive method finds application.

a) A typical MRI (magnetic resonance imaging) scan of the heart returns hundreds of images over time and space. It is very desirable, for example, to extract an outline of the left ventricle in all of the images in order to measure how the ventricle volume and wall thickness change over time and space. This indicates how well the heart is performing. It is not feasible for the human to spend hours doing this task; however, it is straightforward for the human to manually "contour" or "segment" a few of the images. Accordingly, the present inventive method then automatically segments the remaining images. Once all the images have been segmented, the ventricle may easily be checked for volume, ejection fraction, dyskinesia or akinesia, etc.

b) A "smart bomb" or missile can be designed such that once a target is specified, the missile maintains a course lock on the target independent of external control. The present inventive method can be built into such a missile. In this case, the images received vary over time, typically because the source of such images is the missile's video camera or radar transducer—of course, any image producing technology may be utilized. A target, such as a building or other structure, is determined either in real time by a human via remote-control, or is specified in advance, perhaps from satellite reconnaissance photographs. Once the target object is determined, the missile employs the present inventive method to continuously find the target outline or segmented contour in the images, and uses that target outline to maintain a course lock.

c) It is useful to extract a three-dimensional shape from a collection of two-dimensional cross-sections through the shape. For example, in brain scans, a CAT scanner produces a series of two-dimensional images. Two-dimensional images are also produced in gathering seismic data of oil fields. Currently, the only reliable way to construct the three-dimensional image is through tiresome and expensive manual (human) segmentation of each slice. The present inventive method is well suited to automating this problem. Given only a few manual two-dimensional outlines, the present inventive method can segment all of the remaining two-dimensional slices and then "stack" the resulting contours together to form the three-dimensional agglomerate. This is especially useful to those in pharmaceutical, biochemical, and neurobiological fields, who often deal with animal organs, such as rat and cat brains.

d) The present inventive method is useful in solving the "registration problem." This occurs when images from different data sets need to be aligned in the same physical space. For example, a MRI scan of a brain ("soft tissue") might be registered with a CT scan of the skull ("hard tissue"), such that information from both scans (likely amounting to hundreds of images) could be combined in three-dimensional space, making the relationship of brain to skull clear. Another example would be the registration of one type of brain scan showing brain activity, with a different type of scan showing brain anatomy. The present inventive method can be used to detect features common to both scans that occupy the same physical locations, given appropriate training contours for each set of image. In the examples described above, training contours around the eyes would be suitable. After the present inventive method determines the location of the training features in all images, a mapping between sets is determined (since the features themselves occupy the same physical space), such that all the images in the scans may be accurately registered in the same physical space. Continuing the second example above, after a human operator identifies the eyes in a single image of each data set, brain activity information can be easily overlaid upon or combined with brain anatomy information across all the images of the data sets.

e) In computer animation, medical applications, and many other areas, it is desirable to convert a physical three-dimensional shape into coordinates for use by a computer. This is typically done by constructing a model of the shape (i.e. a talking lion cub, a head, a spaceship) and then touching the tip of a wand-like tool or other input device to various points on the shape. The sensor measures the locations of the points in space, and converts them to a form usable by the computer. This process is very time-consuming. The present inventive method may be used to automate the process as follows: First, a camera rotates around the shape, taking sequential photographs. Next, the photographs are segmented using the present inventive method. By matching the segmented outlines of the shape with the positions of the camera, the original shape may be reconstructed by the computer.

f) There is currently a great deal of interest in using "feature extraction," or the automatic recognition of objects in images, to allow placement and lookup of images in databases. The present inventive method may be used to locate features in database applications. Given a training contour for a predetermined object, such as from a library of predetermined contours, the present inventive method searches an image for the object represented by the training contour. The preferred way to do this is to "sprinkle" the image with several search contours (each based on the training contour) which then attempt to locate the target object. If no good match is found by any search contour, the target object presumably does not exist in the image.

g) The present inventive method may also be used to automatically locate shapes and icons (such as cartographic symbols) in images. Again, a good way to do this is to "sprinkle" the image with search contours based on a predetermined library.

The above examples show that the present inventive method is useful in many applications, and may be used in finding and measuring the extents of brains, oil fields, thermal plumes, knee menisci, mineral deposits, polluted areas, subduction zones, and the like.

Specifically, one embodiment of the present inventive method includes the steps of a) providing a set of search images, each search image containing a view of a target object; b) providing a priori domain knowledge corresponding to the set of search images; c) selecting one or more search images to act as training images; d) obtaining a training contour from each training image, the training contour representing an outline of the target object in the corresponding training image; e) utilizing each training contour to extract training information regarding the target object in the corresponding training image; f) associating a selected training contour with a selected search image of the set of images, the training contour defining a search contour; g) deforming the search contour relative to the selected search image and maintaining predetermined information corresponding to the deformed search contour; h) utilizing the training information and the a priori domain knowledge to identify regions of the deformed search contour that correspond within predetermined limits to an outline of the target object in the selected search image; and i) repeating steps (c) through (h) for each unsegmented image in the set of search images so as to segment all of the images in the set of search images.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

DETAILED DESCRIPTION

The following assumptions are applicable to the present inventive method, and do not represent an exhaustive list.

1) An image segmentation method which is both fully-automatic and wide-ranging is not possible. This is because the pixel intensity information of the image is not sufficient, in general, to perform successful segmentation. For successful segmentation in general, some form of prior domain knowledge, such as some knowledge of the size or shape of an object, its expected location in the picture, and the like, is required. Because different images require different a priori information, and because it is not currently possible to elucidate this information for all possible images, human input is required for a wide-ranging method. Conversely, if human input is not required, then the application space must be limited, and the segmentation method cannot be wide-ranging.

2) A segmentation method which looks for high-precision answers will produce poor results. This may appear contradictory. However, all practical images contain noise, variable lighting, poorly delineated borders, etc. A segmentation method that seeks exact, precise answers is invariably distracted by the many false leads present in the image, because at least some of the false leads seem "truer" to the method than the real leads. A segmentation method which seeks fuzzier, less precise information, is surprisingly more likely to produce accurate results.

3) An segmentation method which seeks the global minimum of any energy function will produce poor results. Such global minimization is a common component of many prior art methodologies. However, factors such as random noise are likely to produce a false global minimum. For example, a straight horizontal line clearly has no global minimum. If the line is distorted using small random perturbations, some points on the line will move up, some down, some will not move at all. Accordingly, false minima have been induced (they are false because the "true" shape has no minima). Thus, even small amounts of noise, or image imperfections, may significantly disturb known searches that seek a global minimum.

4) A segmentation method which uses only global information, that is, a property of the target region as a whole, ignoring local variations, will not produce acceptable results. This issue is discussed in greater detail hereinafter.

Figure 1:
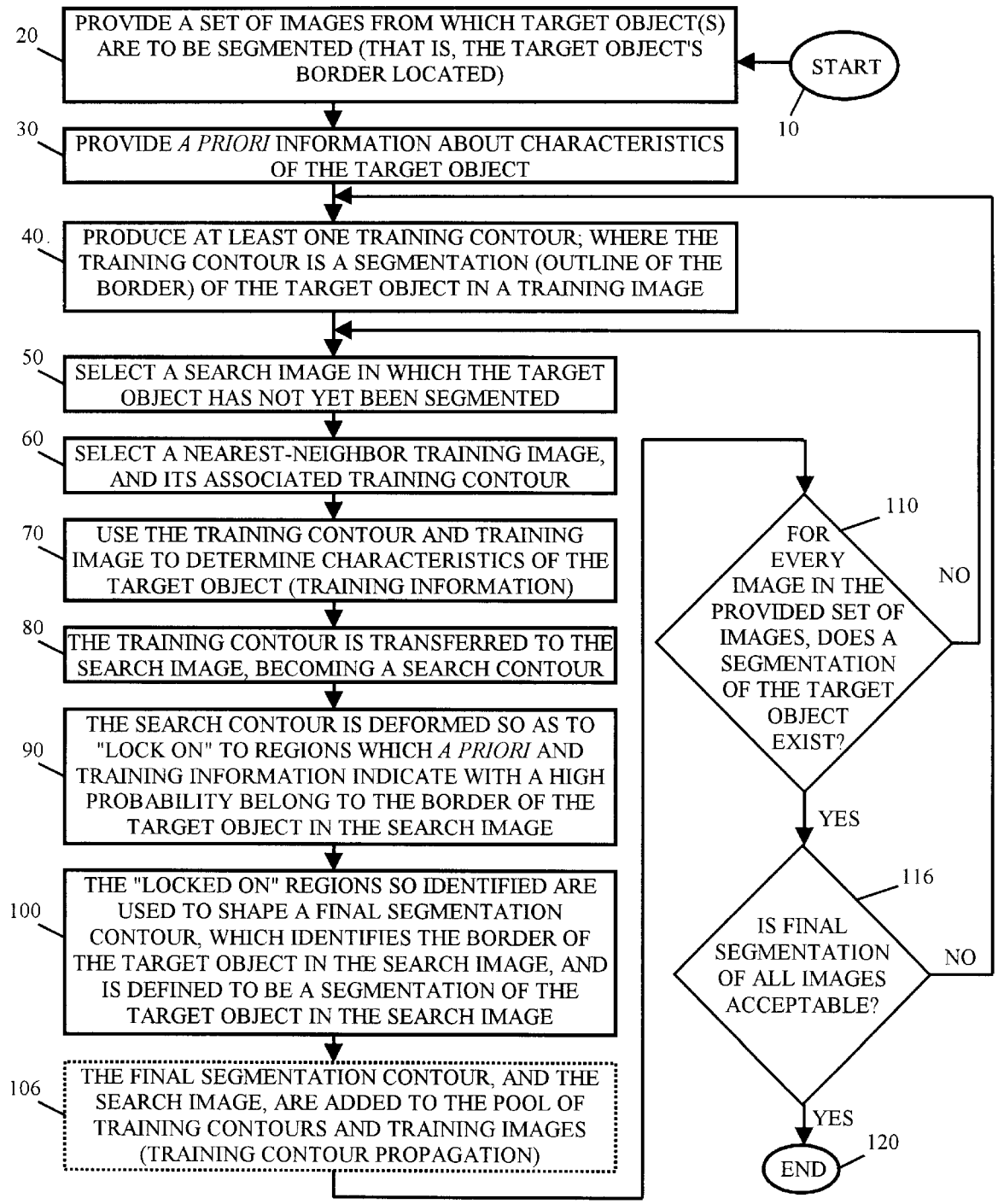
FIG. 1 shows a high-level flowchart according to a specific embodiment of the present inventive method.

Referring now to FIG. 1, a high-level flowchart is provided as an overview of a specific embodiment of the present inventive method. The present inventive method begins, as shown in step 10. As shown in step 20, a set or a series of images is provided as input to the computer system executing the program embodying the present inventive method. In each image, the portion of interest is referred to as the "target object." The "target object" is a single object that appears in all of the images, but may appear from different views or angles, or may change in some way from image to image. For example, if the target object is the left ventricle, then different slices of the left ventricle appear in all of the images over space or time, reflecting both the different data sets acquired during each image acquisition, and the motion of the ventricle over time and space. For example, if the target object is a running dog, then the dog appears with its body differently positioned in each image. In any case, the target object is a single "thing" whose outline or border we want to identify in every image.

One goal of the present inventive method is to find, and to "segment" a particular target object, as shown in each image of the set or series of images. For example, in an image set containing a series of one-hundred images of the heart, the left ventricle may be the target object or object of interest in each of the images. The images may have been produced by imaging a "beating" heart in real time over a relatively short period of time. Thus, the series of one-hundred images may depict the heart as it moves through an entire pumping cycle.

In another example, the images may be individual frames of a movie of a running dog. Thus, the target object is the dog in each of the images. One goal of the method is to "draw" an outline around the dog in each image of the series of images. In another example, the images may comprise different physical cross-sections of an oil field;, accordingly, one goal is to draw an outline around the extent of the oil field in each image. This process is referred to as "segmentation," or "image segmentation," and seeks to define the outline of the target object in each image.

As described above, prior art methods cannot successfully segment a wide range of target objects without human or domain-knowledge input. Therefore, the present inventive method is provided with a priori information about characteristics of the target object, as shown in step 30 of FIG. 1. Such a priori information may include characteristics concerning the target object, such as whether it is round or rectangular, whether it is spinning, or whether the image appears to be progressing in a linear manner from frame to frame. This information is preferably in the form of rules built into the software. For example, if a contour is known to be round, then a rule may specify that the segmentation process should attach low preference or reliability to regions of a contour that form sharp corners.

Note that supplying a priori information, as shown in step 30, and supplying operator segmentation, as shown in step 40 (discussed hereinafter), are optional if the target object is of such high quality that it may be distinguished from its surroundings on the basis of pixel intensities alone. For example, if the target object is gray and the rest of the image is black, a priori information and operator segmentation need not be supplied. In the real world tasks, however, such an optimal situation is rare. Accordingly, in the present inventive method, step 30 and step 40 are performed so that the segmentation results have an acceptable level of quality and accuracy in real-world applications.

As shown in step 40, manual segmentation of at least one of the images or target objects in the set of images is performed by an operator or user. For example, the operator may use a mouse or other input device to draw a contour around the target object in one or more of the images. The user-supplied manual segmentation(s), as performed in accordance with step 40, is referred to as "training contour(s)," and the image(s) so segmented is referred to as "training image(s)."

Preferably, in step 40, about 5% of the images of the set of images are segmented manually to produce training contours, but the exact percentage will depend on the particular application. Satisfactory results are usually obtained with operator segmentation of only a single image of the set of images. The selection of which images to use as training images is performed by the operator or user: images in which the target object appears having the greatest size, thus providing the greatest amount of overall information, are preferably selected. In step 40, it is contemplated that alternately, manual segmentations may be provided from a pre-constructed library, rather than being provided each time by a human operator. The result of step 40 is that a pool of training images and training contours is made available to the present inventive method. Each training image corresponds to one training contour, and vice-versa. Each training contour is assumed to provide an accurate segmentation of the target object in the corresponding training image.

Next, as shown in step 50, a "search image," which does not have an associated training contour, is chosen. The search image is one of the images in the set of images. For example, with respect to the example involving images of the heart described above, the search image may be the fifth image in the series of images. The ultimate goal is to "draw" an outline around the target object in this search image. The selection of the search image is performed by the present inventive method. Preferably, search images are chosen in a linearly progressive fashion.

Next, as shown in step 60, a nearest-neighbor training image (relative to the search image) is selected by the present inventive method. If only one training image exists, then it is selected. If multiple training images are available, then the one that lies closest to the search image in time or space is selected. The result is that images are segmented according to their nearest-neighbor training image and training contour. Equivalently, the training images and training contours act like "pebbles thrown in a pond," so that segmentation-processing spreads outward from them like ripples.

Next, as shown in step 70, information about the target object, as it appears in the training image, is extracted by analyzing the training contour that is associated with the training image. The training contour is produced in either step 40 or step 106, and as mentioned above, is assumed to provide an accurate outline of the target object in the training image. The training information, which includes the calculation of geometric parameters, such as area, and pixel intensity ("histogram") parameters, is explained in greater detail hereinafter.

Next, the training contour that was previously analyzed is associated with the chosen search image, as shown in step 80. "Associated," as referred to hereinafter, means that the training contour is considered to be placed on, or overlaid upon, or transferred to the search image, such that the training contour describes a region in the search image. This transforms the training contour into a "search contour." Note that training contours are used to determine information about the target object as it appears in training images, while search contours are used to look for the target object in subsequent images or search images. Of course, insofar as training contours are accurate segmentations of the target object in the training images, they are also used as successful segmentations of the training images in the final output of the present inventive method. That is, the present inventive method does not segment the training images a second time.

Next, as shown in steps 90 and 100, the search contour "moves around" in an attempt to "lock onto" boundaries which are likely to correspond to the outline of the target object in the search image. Finding such boundaries is largely a function of the training information that was extracted from the training contour and the a priori information provided to or built into the system, as will be described in greater detail hereinafter.

In step 100, boundary areas that were "locked onto" during search contour motion of step 90, that is, determined to belong to the target boundary with high probability, as discussed below in the section on gradient search, are used to fashion a final contour. The final contour found is referred to as the "segmentation contour" because it is the segmentation of the target object in the search image.

As shown in step 106, the final segmentation contour and the search image are optionally added to the pool of training contours and training images. If this is done, the search image is subsequently considered to be a training image, and the final segmentation contour is subsequently considered to be a training contour. Thus, final segmentation results may themselves be used to derive training information for one or more subsequent iterations of the method (steps 50 through 110): this is called "propagation" of training contours. Due to the nearest-neighbor method of selecting training contours, if training contour propagation is active, then contours tend to be retrained from image to subsequent image.

Use of the newly derived segmentation contour as a training contour, as shown in step 106, is preferable if the appearance of the target object is not changing in a periodic fashion over the set of images (e.g., an oil field). However, use of only the original pool of training contours is preferable when the substituents of a particular set of images are all closely related, as is typically the case in periodic change of the target object over the set of images (e.g., a beating heart, over time): in this case, using only one training contour for all the images, instead of regenerating the training contour from image to image, produces better results by reducing any propagation of error.

Next, as shown in step 110, the set of images is checked to determine if each image has been segmented. If not all of the images have been segmented, the iterative steps of 50 through 110 are repeated. Equivalently, the iterative steps of 50 through 110 are repeated until all of the available images of the set of images are segmented. If additional images remain to be processed, as shown in the "no" branch of step 110, the program branches back to step 50 to continue processing. After all of the images of the set of images have been segmented, as shown in the "yes" branch of step 110, and if all segmentations are of sufficiently high quality, as determined by the human operator, as shown in the "yes" branch of step 116, the method terminates, as shown in step 120.

If the segmentations are not of sufficiently high quality, the operator may provide more manually produced training contours, as shown in the "no" branch of step 116, which transfers processing back to step 40. The judgement of overall segmentation quality is preferably made after all the images are processed, so that the operator may see the sequence of images and determine where more manual segmentations are needed. Generally, more manual segmentations will be required at points of discontinuity or rapid change of the appearance of the target object from image to image. The final quality of the image segmentation is increased if more manually segmented contours are provided. Of course, the higher the initial quality of the images, the fewer manually produced contours are required.

The images that are segmented may lie in any type of sequence, that is, the images may lie in time, in space, or both. In other words, the target object may have a relatively fixed form, but its position may vary in time: for example, as in sequential photos of a moving plane. Variation of the images with respect to both time and space applies to the above example with respect to the heart. The present inventive method is equally applicable to both situations.

On a side note, due to the nearest-neighbor way in which images are searched, the present inventive method is amenable to methods of parallel programming, where images are segmented in parallel instead of one at a time. The fundamental mechanics of the present inventive method are unchanged by parallelization, and it is not discussed further.

Description of the Set of Images Provided

The present inventive method is provided with a collection of images or a set of images. These images are related in that they all contain views of a target object. The images may vary over space and/or time or in any other way. One requirement is that the target object must vary gradually from image to image. If there are severe discontinuities in the appearance of the target object from one image to another, then the present inventive method may fail to find the target, because the method searches for similarities from image to image. However, such a problem is easily solved by simply providing additional training contours at points of discontinuity, so that the method "knows" what exactly to look for at the places of discontinuity or transition.

Examples of valid image sets, some already described above, include: a) MRI cross-sections of the thoracic cavity taken over both time and space; b) cross-sections of seismic data taken over space; c) satellite photographs of a moving spy plane crossing jungle terrain, taken over time; and d) real-time stereoscopic images of a road taken from dual-mounted cameras on the hood of a robotic vehicle.

Desirable target objects for these image sets may include, respectively: a) the left ventricle of the heart; b) an oil field; c) the plane, as opposed to the jungle beneath; and d) road markings. Upon successful segmentation of these features, the results could be used for the following purposes, respectively: a) calculation of the ejection fraction of the left ventricle; b) extents of the oil field; c) velocity and heading of the spy plane; and d) control of the robotic car to maintain its course.

Note that the images of the image set may have undergone processing using standard image-processing techniques, such as filtering, smoothing, and morphological operations (erosion, dilation, etc). Similarly, the training contours provided to the present inventive method may be based either on raw image data, or may be based on images processed using standard image-processing techniques. In general, any image processing that makes the target object more easily recognizable to a human, or that makes the target object more readily distinguishable from its surroundings, will also make the target object more easily recognizable to the present inventive method. For example, image processing may be used to remove noise. Applying image processing may therefore increase the quality of the final segmentation. However, such image processing is not required for the proper functioning of the present inventive method. Obviously, training contours may be derived from images either prior to or subsequent to image processing. Similarly, searching may take place on images either prior to or subsequent to image processing.

As previously described, once the image set has been determined, an external source, such as the human operator, provides one or more contours (training contours) around the target object in one or more of the images in the image set. The operator may do this, for example, by using a mouse or other input device to draw a curve around the target object as it appears in the image(s). Continuing the examples above, a human operator might pick a single image from each image set and manually draw a contour around, respectively: a) the left ventricle; b) the boundary of the oil field; c) the spy plane; and d) the road markings. In the last set, the human operator would obviously want to segment an image taken early in time so that the robotic car would not deviate off course. In this way, the external source provides domain-specific knowledge for use by the present inventive method. Note that other domain-specific knowledge is built into the segmenting system itself, preferably in the form of rules. For example, geometric information may be used to constrain final shaping of the segmentation contour.

For purposes of clarity of illustration only, and to simplify the present description without loss of generality, is it assumed that the target object has been manually contoured or "outlined" on a single training image, so that there is one training contour. (If multiple training contours are provided, segmentation proceeds on a nearest-neighbor basis, as described above.)

The present inventive method is initially provided with an accurate training contour describing the outline of the target object as it appears in the training image. The inventive method then processes a subsequent image that is "near" the training image. As used herein, the term "near" with respect to two images means proximity in time and/or space.

Contour Definition

Figure 2:
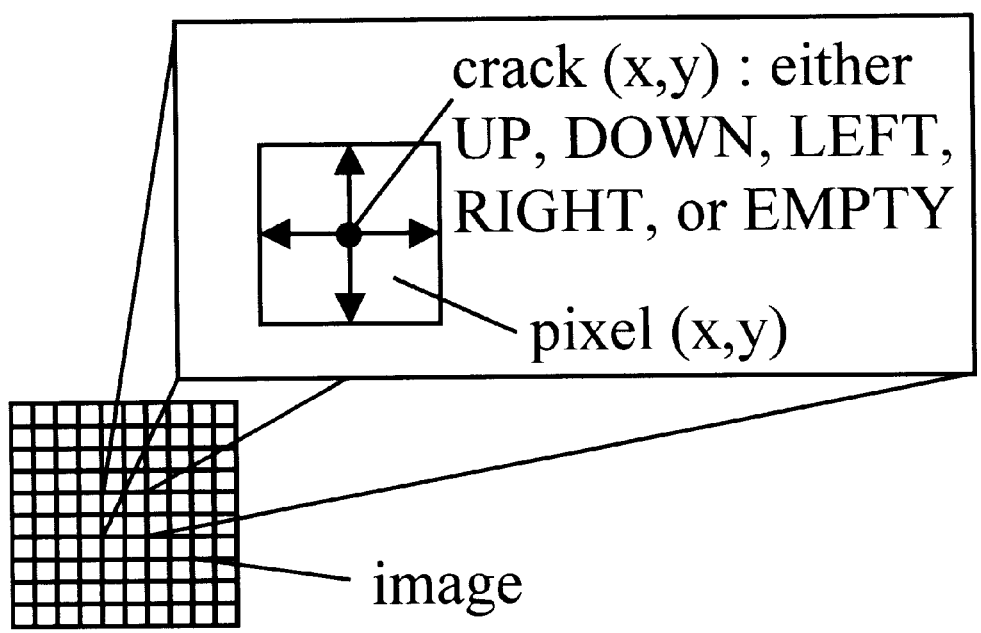
FIG. 2 is a diagram showing the relationship between cracks and pixels.

Referring now to FIG. 2, a contour is defined as a "curve" in space. Further, a "crack" is defined as the space between two adjacent pixels in a two-dimensional image. The use of cracks is common in the art, but as described herein, a novel representation permits cracks to be used in a highly efficient manner on a digital computer. A crack may be represented as follows:

1) An (x,y) coordinate corresponding to the upper-left corner of the pixel at location (x,y) in the image; and
2) A direction defined as one of the following:
   a) EMPTY (if the crack is not filled)
   b) UP ("U")
   c) DOWN ("D")
   d) LEFT ("L")
   e) RIGHT ("R")

A contour is defined as a chain of non-empty cracks describing a curve that is simple, meaning that it does not intersect itself The contour is also defined to be closed, meaning that any crack can be reached from any other crack by "traveling" along the chain of cracks. In addition, contours are arbitrarily restricted to be described in a clockwise direction. Thus, the interior of the curve is always to the right, and the exterior is always to the left, as one travels along the contour in the direction indicated by the cracks. Because a contour consists of inter-pixel cracks, a contour is considered to be infinitely thin.

Figure 3:
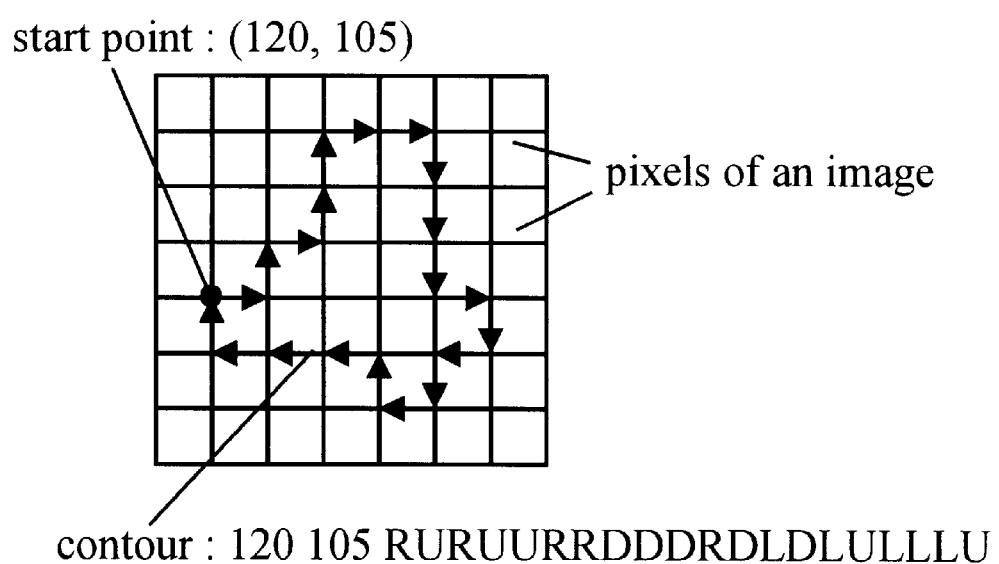
FIG. 3 is a diagram showing a contour represented as a string.

Referring now to FIG. 3, a contour may be represented by a string of characters, such as, for example, by the string "120 105 RURUURRDDDRDLDLULLLU." The contour shown in FIG. 3 begins at crack location (120, 105) and proceeds as indicated by the crack directions, indicated as arrow heads in FIG. 3. This representation is very compressed, and easily readable by a human. Therefore, it is useful for saving and retrieving contours to or from computer storage, such as disk-drive storage, and for viewing by humans.

Figure 4:
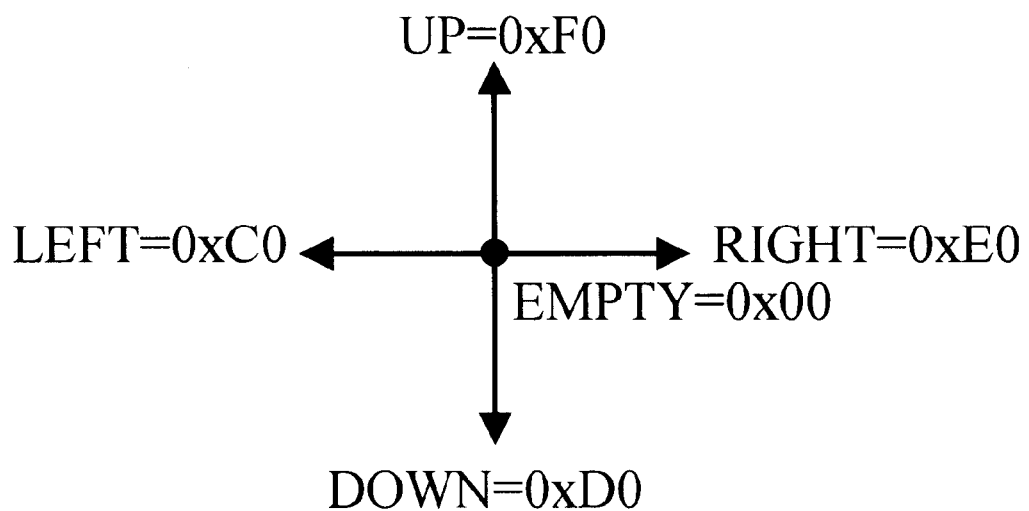
FIG. 4 is a diagram showing a specific method for encoding cracks.

Referring now to FIG. 4, a contour may be represented in another way as a two-dimensional array, where the array value at location (i,j) stores the value of the corresponding crack at image location (i,j). For the contour shown in FIG. 3, the value "RIGHT" is stored at location (120,105), while the value "UP" is stored at location (121,105), and so on, until the entire contour is defined. The following novel encoding scheme, for reasons described below, is used to represent crack directions in the two-dimensional array representation of FIG. 4.

0x00=EMPTY
0xF0=UP
0xD0=DOWN
0xC0=LEFT
0xE0=RIGHT

Here, the prefix "0x" indicates a hexadecimal (base 16) number. The encoded values correspond, respectively, to the decimal numbers 0, 240, 208, 192, and 224. Note that each value is one byte wide. For example, the value "D0" in hexadecimal notation corresponds to a binary representation of "11010000," which is equal to a decimal value of 208.

Figure 5:
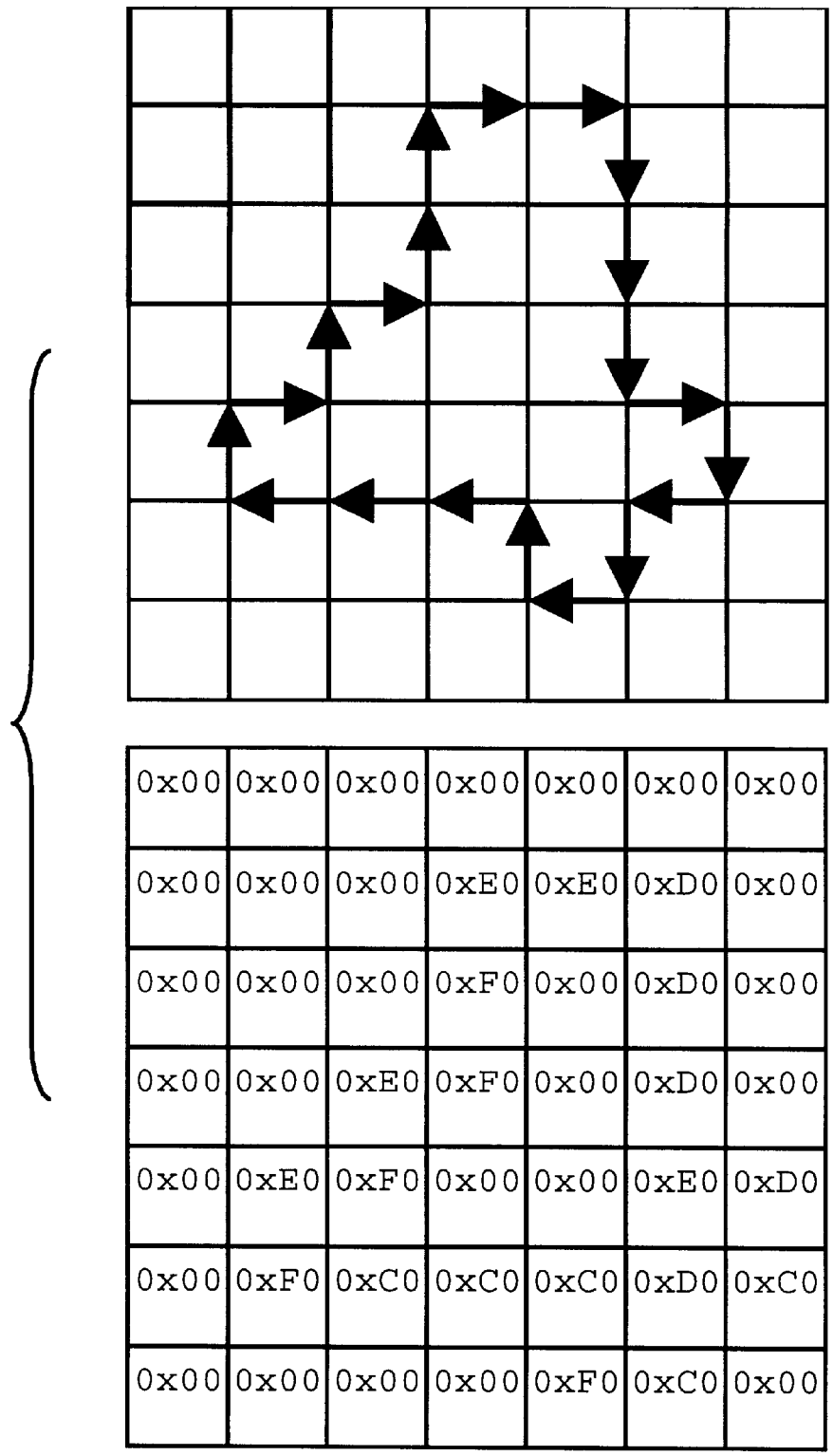
FIG. 5 is a drawing showing a contour represented as a two-dimensional array.

Referring now to FIG. 5, a contour is represented as a two-dimensional array. The contour is shown in the left-hand illustration as a series of arrows, while the corresponding mathematical notation is shown in the right-hand illustration as entries in a matrix of (i,j) entries. Because lookup of a value in an array is very fast, this is the representation used by the present inventive method for every purpose except storage in disk-drive memory, and viewing by humans, as described above.

For convenience, "the crack at location (x,y)" will be abbreviated as "the crack (x,y)" hereinafter. Both contour representations described above are functionally identical and manage cracks as the vertices at the corners of pixels, thus establishing a one-to-one correspondence between cracks and pixels (note that there is one upper-left corner for every pixel).

Some prior art methods manage cracks as the edges between vertices. Such methods are much more complex because there are more inter-pixel edges than pixels, and a one-to-one correspondence cannot be established. Such methods describe 8-connected regions, in which it is possible for pixels in a region to be adjacent to other pixels of the same region via diagonal moves only. The present inventive method describes only 4-connected regions, in which any pixel may "travel" to any other pixel via horizontal and vertical moves. Use of 8-connected regions is inefficient and unnecessarily complex. The novel vertex-based representation used herein is superior to the representation used in the art.

Figure 6:
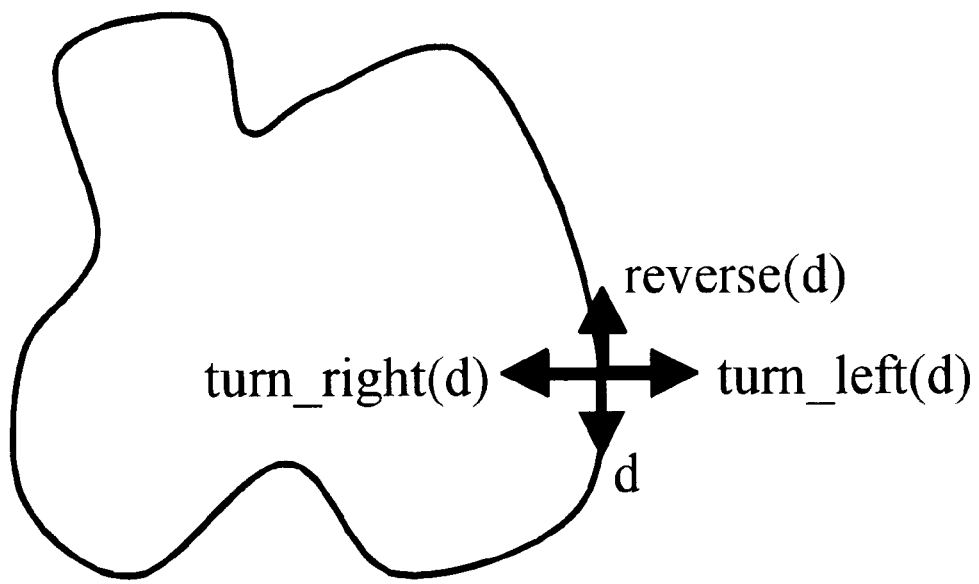
FIG. 6 is a drawing showing rotations of a crack.

Referring now to FIG. 6, it is useful to rotate crack directions. For example, rotating a crack to the right immediately indicates which way the interior of the region described by the contour lies. This is an advantageous result of the novel crack encoding representation described above. Given a direction d:

(d−0x10)|0xC0 produces d rotated to the right, or TURN_RIGHT(d)

(d+0x10)|0xC0 produces d rotated to the left, or TURN_LEFT(d)

(d^0x20) produces the reverse of d, or REVERSE(d)

In the above representation, "^" is the bitwise XOR (exclusive or) operation, and "|" is the bitwise OR operation. For example, if we add 0xD0 to 0x10, then perform a bitwise OR with 0xC0, the result is 0xE0. (DOWN rotated to the left is RIGHT.) Since bit-level operations require only a single microprocessor clock cycle, we may rotate crack directions quickly, thus significantly reducing computer processing requirements.

For example, given a direction d=UP or 0xF0, to rotate the UP direction to the right, the following operations are performed:

0xF0−0x10=0xE0

0xE0|0xC0=0xE0, which represents RIGHT. Thus, the direction of UP rotated by one quadrant (ninety degrees) clockwise becomes RIGHT.

In another example, given a direction d=LEFT or 0xC0, to rotate the LEFT direction to the right, the following operations are performed:

0xC0−0x10=0xB0

0xB0|0xC0=0xF0, which represents UP. Thus, the direction of LEFT rotated by one quadrant clockwise becomes UP.

Computer processing loads are appreciably reduced because time-consuming "if-then branches" are eliminated. Thus, the novel encoding contributes to the speed of the present inventive method.

Contour Geometry

Figure 7:
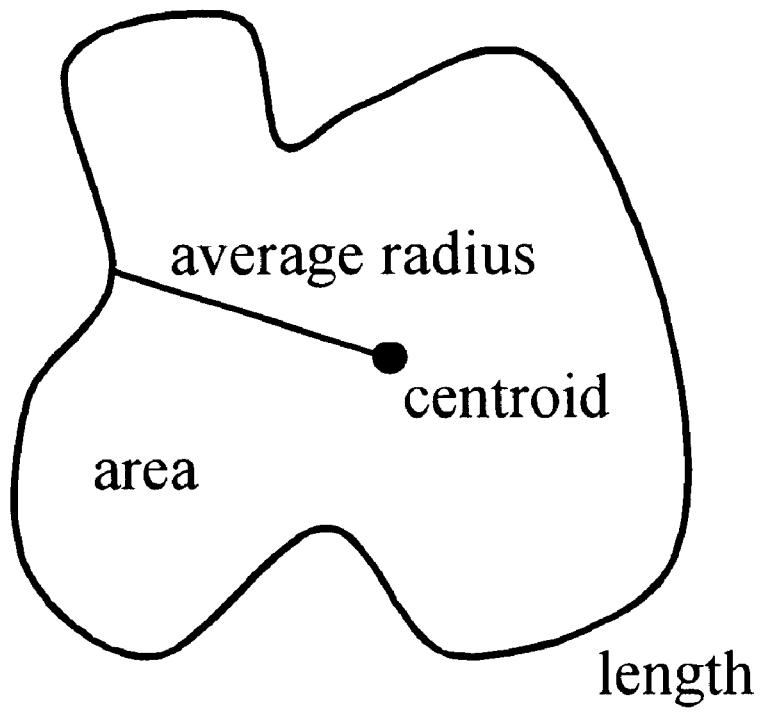
FIG. 7 is a drawing showing specific illustrations of geometric measurements of a contour.

Referring now to FIG. 7, given a contour as defined, useful geometric information is attached thereto. The present inventive method keeps track of the length of the contour, the area of the contour, the sum of the x coordinates of all the cracks or sumX, the sum of the y coordinates of all the cracks or sumY, the centroid (center of gravity), and the sum of the distances (radii) from the centroid to each crack or sumRadii. The average radius is equal to (sumRadii/length). FIG. 7 shows some of these variables pictorially. Other quantities, such as curvature and deviation of the average radius from the mean, can be calculated from these measurements if such quantities are useful for a particular application.

To further explain the variables corresponding to a contour:

Let $(x_i, y_i)$ with i ranging from 1 to n be a collection of points. Then the centroid of the points is defined as $(c_x, c_y)$, where $c_x=(1/n)*$(sum of all $x_i$) and $c_y=(1/n)*$(sum of all $y_i$). Physically, the centroid is the center of gravity of the collection of points. When calculating the centroid of a contour, we use the coordinates of the contour cracks as $(x_i, y_i)$.

The following table summarizes the important geometric information maintained for the contour by the present inventive method.

Let a contour consist of cracks $(x_i, y_i)$, where i ranges from 1 to n.
The geometric information maintained about the contour by the present inventive method includes:
startX (x coordinate of the contour's starting crack)
startY (y coordinate of the contour's starting crack)
length (length of contour, equal to n)
area (area of contour, in pixels)
sumX = $\Sigma x_i$ (sum of x coordinates)
sumY = $\Sigma y_i$ (sum of y coordinates)
centroidX = sumX/length (x coordinate of centroid)
centroidY = sumY/length (y coordinate of centroid)
sumRadii = $\Sigma r_i$ (sum of radii relative to centroid)
    where $r_i$ = square-root($(x_i - centroidX)^2 + (y_i - centroidY)^2$)
averageRadius = sumRadii/length Pseudocode to compute these quantities is as follows.

Pseudocode to obtain the next crack in the contour chain

Input: (x, y), a crack coordinate
let d be the direction of the crack (crack value) at coordinate (x,y)
switch (d)
{
    case UP:    let y = y − 1
    case LEFT:  let x = x − 1
    case DOWN:  let y = y + 1
    case RIGHT: let x = x + 1
}
(x,y) now is the coordinate of the next crack in the chain
Pseudocode to obtain the crack pointed to by another crack Input: (x, y), a crack coordinate, and d, a crack direction
switch (d)
{
    case UP:    let nextX = x, let nextY = y − 1
    case LEFT:  let nextY = y, let nextX = x − 1
    case DOWN:  let nextX = x, let nextY = y + 1
    case RIGHT: let nextY = y, let nextX = x + 1
    otherwise: print error message
}
(nextX, nexty) is now the crack coordinate pointed to by a crack of value d at location (x, y)
Pseudocode to compute the length of a contour let x = startX
let y = startY
let length = 1
while (length < 100000) // or any other really large number
{
    let (x,y) be the next crack in the chain
    if (x equals startX) and (y equals startY)
        stop and return length
    let length = length + 1
}
print error message (length overflow)
Pseudocode to compute the area of a contour let x = startX
let y = startY
let area = 0
let i = 0
while (i < length)
{
    let d be the crack value at (x, y)
    if (d equals RIGHT)
        area = area − y
    if (d equals LEFT)
        area = area + y
    let (x,y) be the next crack in the chain
    let i = i + 1
}
return area
Pseudocode to compute sumX, sumY, and centroid of a contour let x = startX
let y = startY
let sumX = 0
let sumY = 0
let i = 0
while (i < length)
{

-continued

```
    let sumX = sumX + x
    let sumY = sumY + y
    let (x,y) be the next crack in the chain
    let i = i + 1
    }
let centroidX = sumX/length
let centroidY = sumY/length
Pseudocode to compute sumRadii of a contour let x = startX
let y = startY
let sumRadii = 0
while (i < length)
    {
    let sumRadii = sumRadii +
    square-root((x-centroidX)² + (y-centroidY)²)
    let (x,y) be the next crack in the chain
    let i = i + 1
    }
```

Note that computing the length, area, centroid, and average radius of a contour is expensive in general. With respect to "O" or the order of the amount of time required to perform an operation, the above variables require O(n) time to calculate, where n is the number of cracks in the contour. A novel method is described below that allows for incremental updating of all such measurements in O(1) time, rather than in O(n) time.

Contour Segments

The geometric information about the contour obtained so far is global in nature: that is, it describes features of the entire contour. However, it is important to obtain local information as well. This is a common failing of many prior art segmentation methods, which usually downplay or completely neglect locality.

Figure 8:
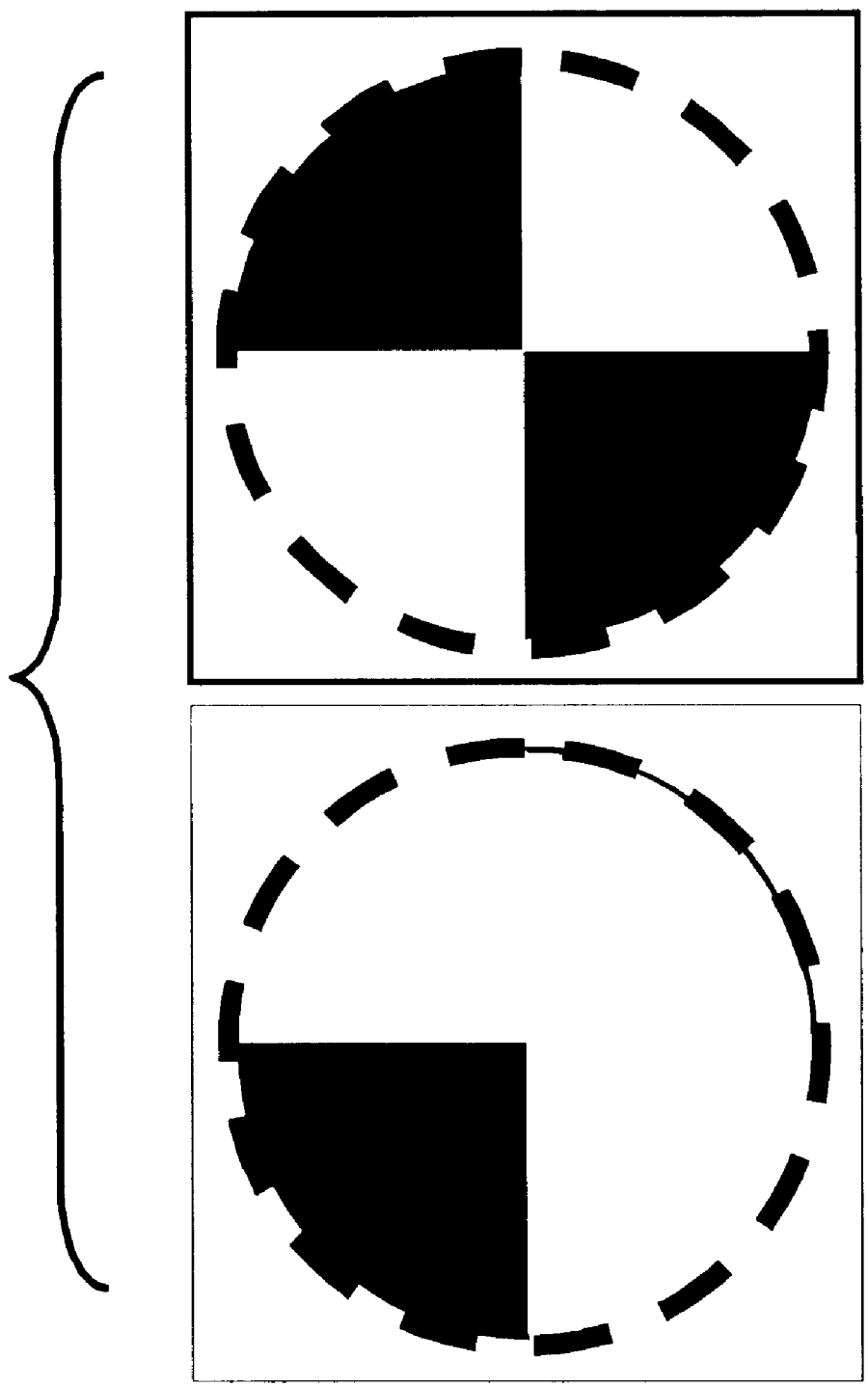
FIG. 8 is a drawing showing two images that are indistinguishable using only global information.

Referring now to FIG. 8, the two drawings demonstrate why locality is important. FIG. 8 illustrates two drawings, which are obviously different, yet which cannot be distinguished at all by looking solely at global features, because the overall distribution of black versus white is the same in both drawings. In other words, if the dotted circles are segmentation contours, then they cannot be distinguished from each other using solely global information; the interior of each contour contains the same overall quantity and distribution of black and white relative to the exterior. Only by comparing the distribution of black versus white in individual quadrants can the pictures be differentiated. This seemingly simple example dismisses a large amount of prior art, as any prior art method that uses solely global information to pursue segmentation will fail.

Figure 9:
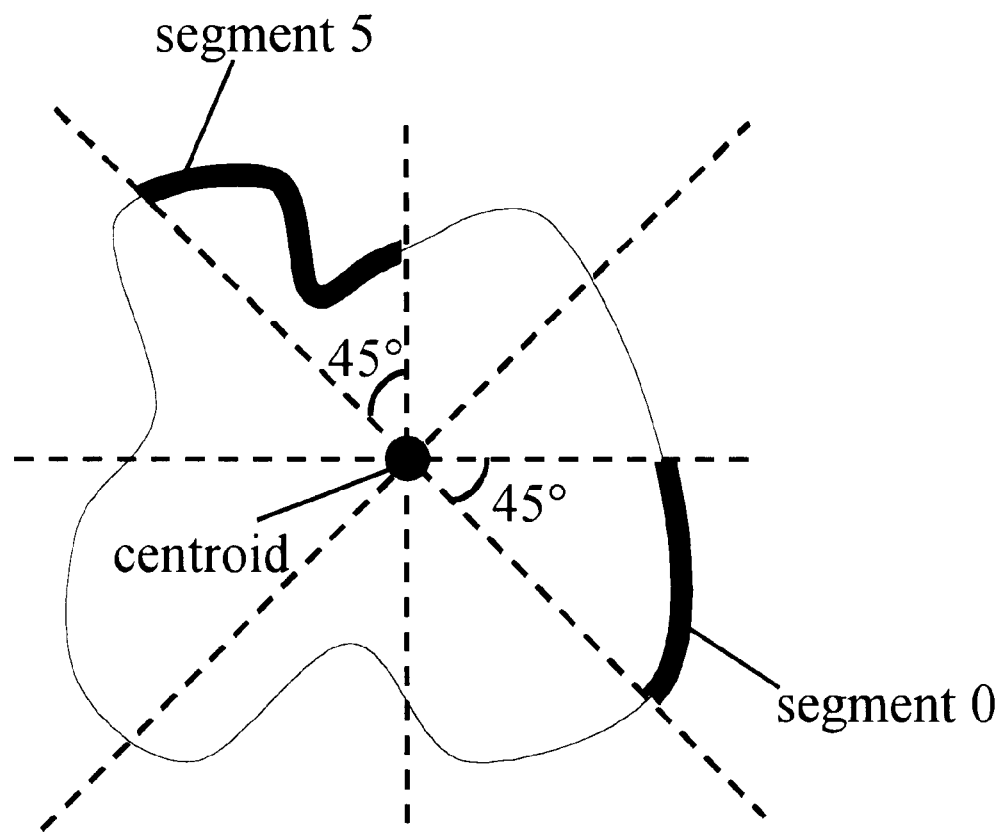
FIG. 9 is a drawing showing a contour divided into eight segments.

The centroid (center of gravity of the contour) is an important feature in the concept of locality, as it is used to segment or partition the contour into pieces independent of the position of the contour with respect to any physical coordinate system. In other words, if the contour is translated (moved to a different place on the associated image without modifying the shape of the contour), the partitioning of the contour into segments will be unchanged. Note that the use of the term "segment" in this context is not to be confused with the term "segmentation," and is used generally herein. To obtain segments of the centroid, rays are extended from the centroid at equal angular intervals, as shown in FIG. 9. All cracks that fall into an angular "pie-slice" or "arc" are considered to belong to the same "segment." For example, if the angular interval is 45 degrees, then all the cracks that appear in the "pie-slice" between 0 and 45 degrees (relative to the centroid) are grouped into one segment, while all the cracks between 45 and 90 degrees are grouped into another segment; and so on. Zero degrees corresponds to a horizontal x-axis extending rightward from the centroid, and values of degrees increase going clockwise. The centroid defines a local coordinate system that is unchanged by translation of the contour.

Let the contour be divided into N equal segments, numbered from 0 to N-1 (segment numbers start at zero degrees and increase going clockwise). Using trigonometry, we may easily obtain the segment number of any particular crack by calculating the angle of the crack relative to the centroid, so that the centroid defines the origin of the coordinate axes. This value is then multiplied by the number of segments in 360°.

However, floating point arithmetic, and especially trigonometry, is very expensive in terms of computation time. Thus, the present inventive method employs a faster method that uses predominantly integer arithmetic and table lookup. Given a crack in the contour, the present method quickly calculates the segment in which that crack is located. This is done by first calculating the slope of a line drawn from the crack to the centroid, and then comparing that slope to a table of slopes of the border lines between segments. This method requires that the number of segments be evenly divisible by four (or equal to one, if there is no partitioning of the contour into segments—in which case the entire contour is considered to be just one segment), because table lookup proceeds in the same manner for each of the four quadrants (or always returns the value 0, if there is no partitioning). The pseudocode for this novel method is shown below.

```
Pseudocode to construct the lookup table for obtaining segments

Input: numsegments, the number of segments into which the contour
            should be divided
        (numsegments must be either evenly divisible by four,
            or equal to one)
if (numsegments > 1)
    {
    let angle = 2 * PI/numsegments
    let i = 0
    let slopes be an array of floating-point numbers,
        of size (numsegments/4)
        while (i < (numsegments/4) - 1)
        {
        let slopes[i] = tan(angle)
        let angle = angle + (2 * PI/numsegments)
        let i = i + 1
        }
    let n1 = numsegments/4
    let n2 = n1 * 2
    let n3 = n1 * 3
    }
Store slopes, n1, n2, and n3 for later use.
    (If numsegments is one, their values are not important, as
        the contour will not be partitioned and they will not be used.)

Pseudocode to obtain the segment in which a crack lies

Input: x and y, the coordinate of a crack in the contour
if (numsegments equals 1)
        return 0
let x = x - centroidX
let y = y - centroidY
if (x equals 0)
        {
        if (y > 0)
                return n1
        else
                return n3
        }
else
```

```
        {
        let m = abs(y)/abs(x) //abs is "absolute value"
        let i =0
        while (i < (numsegments/4) - 1)
            {
            if (m < slopes[i])
                break out of while loop
            else
                let i = i + 1
            }
        if (x > 0)
            {
            if (y ≧ 0)
                return i
            else
                return numsegments - i - 1
            }
        else
            {
            if (y > 0)
                return n2 - i - 1
            else
                return n2 + i
            }
        }
The value that is returned is the number of the segment
    (from 0 to numsegments - 1) in which the
crack lies.
```

With segment manipulation using integer arithmetic, local information is maintained using minimal computational effort.

Histograms

Figure 10:
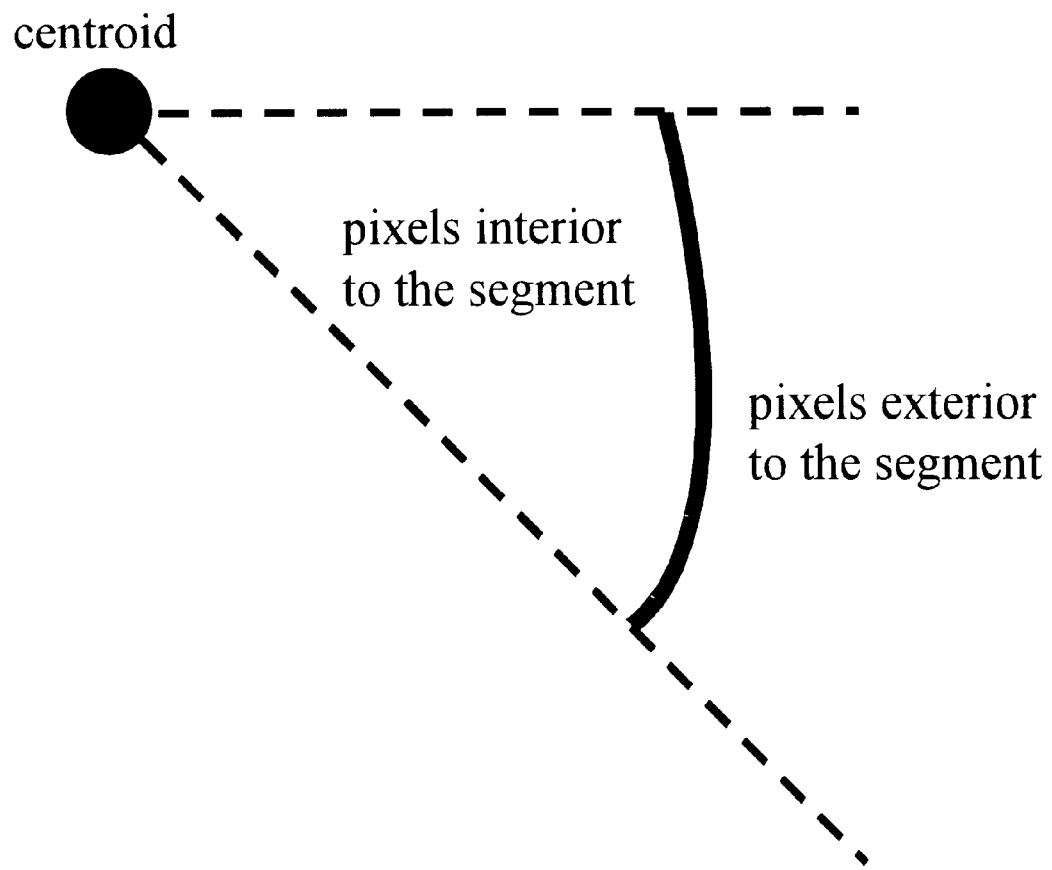
FIG. 10 is a drawing showing an enlarged image of a segment.

The usefulness of segments is that by defining local stretches of a contour, they define local areas of the image with which the contour is associated. This means that each segment has pixel intensity information associated with it. The pixels lying within the segment, that is, within the boundaries defined by the segment, have some distribution of intensities. This is also true for the pixels exterior to the segment, as shown in FIG. 10. In general, different segments have different distributions. This is what is meant by "locality."

Figure 11:
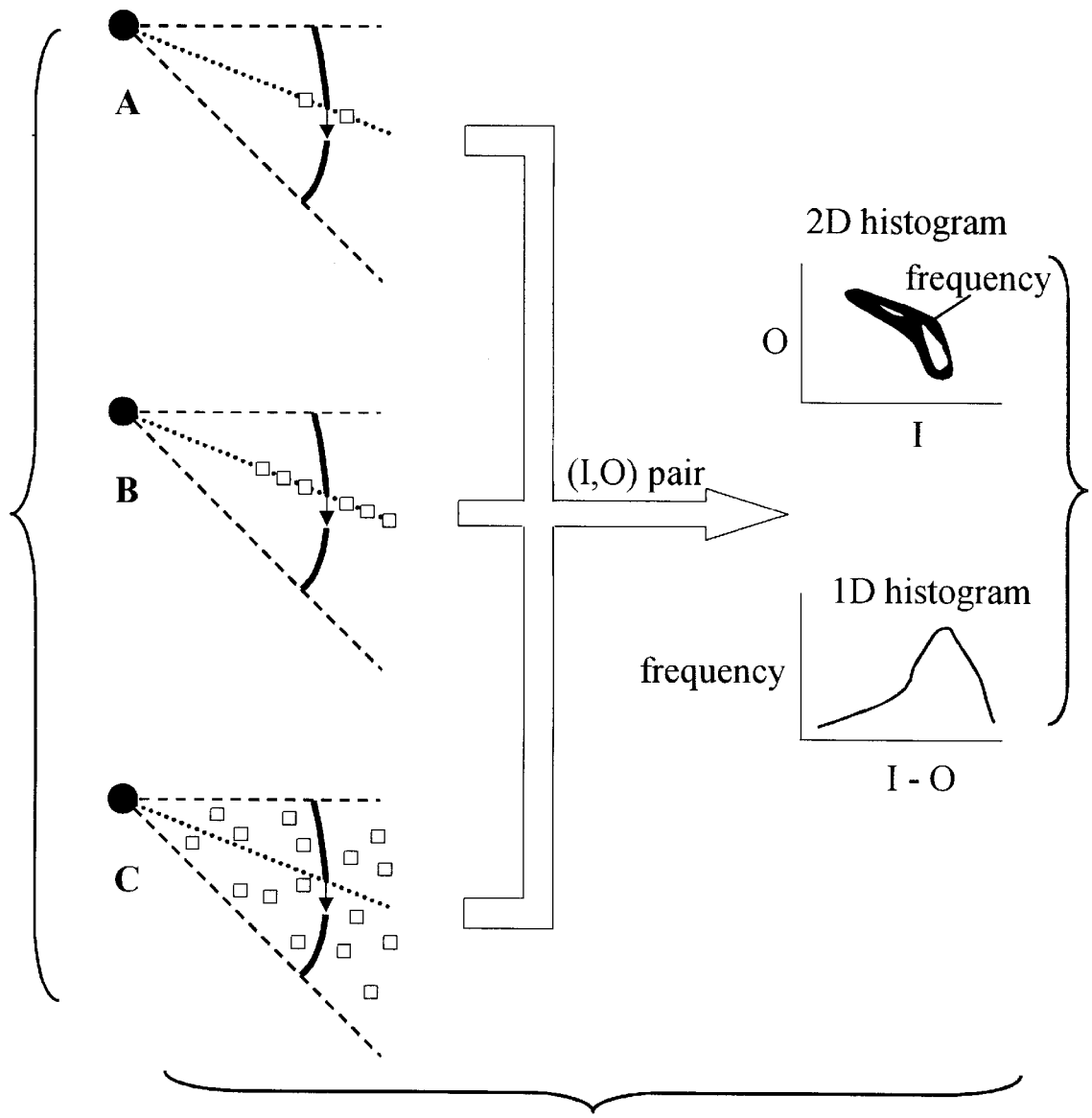
FIG. 11 is a drawing illustrating various ways to construct histograms from the cracks of a segment.

It is necessary to use a method of categorizing or analyzing pixel intensity distributions. There are many ways to do this, including statistical and aggregate methods. However, "histograms" are especially useful because they are simple and effective. Note that a histogram is a collection of frequencies, each of which counts the number of occurrences of a thing or event. Examples of various means to calculate histograms are shown in FIG. 11. It is contemplated that other means of pixel intensity analysis may be used in the present inventive method, depending upon the particular application. For example, normal distributions ("bell curves"), instead of histograms, may be calculated from collections of pixel intensities.

Define an (I,O) pair to be a pair of two numbers, where "I" is a number describing some property of a segment's interior, and "O" is a number describing some property of a segment's exterior. For every crack of a particular segment, a separate (I,O) pair is computed: each (I,O) pair is specifically associated with a particular crack of the segment in question. Means for computing such (I,O) pairs are described below. Whenever an (I,O) pair is placed into the 2D histogram, the histogram value at location (I,O) is incremented by some number, preferably one. Thus, a segment histogram counts the frequency of occurrences of the (I,O) pairs in a segment. For example, if the (I,O) pair (70,130) appears 25 times in a particular segment (that is, it is the (I,O) pair computed for 25 cracks of the segment), the histogram for that segment preferably contains the value 25 at location (70, 130). It should be noted that the (I,O) pairs of a segment do not depend in any way on the physical coordinates of the segment, but only on the image pixel intensity values that lie inside and outside the segment. In other words, the location of a contour on an image has no effect on the contour histograms, except insofar as the pixel intensities of the image vary from location to location.

A one-dimensional (1D) histogram may be used instead of a 2D histogram. Instead of storing an (I,O) pair, the scalar difference between I and O (that is, I minus O) is stored. However, this introduces degeneracy. For example, the pairs (70, 130) and (80, 140) are both mapped to the same histogram entry. Capabilities for both types of histograms are implemented in the present inventive method, but empirical tests indicate that the 2D histograms are superior to the 1D histograms, and so are preferred. Since the 1D histogram is a special case of the 2D histogram, it is not described further.

A segment histogram provides information about the pixel intensity distribution surrounding a contour segment. Each contour segment requires its own histogram for locality. Assume that I and O numerical values occupy no more than 12 bits. Then the I and O values calculated for each crack (as described below) may each range from 0 to 4095, and each 2D histogram, if represented as a simple 2D array, requires 4096*4096=16.8 megabytes. If the contour uses 16 segments, these histograms occupy a total of about 270 megabytes of memory. This is not feasible. In addition to insufficient amounts of memory to handle the above situation, data swapping and disk access limitations would slow the computer to unacceptable levels.

To solve this problem, chained hash tables are used instead of 2D arrays to represent the histograms. Chained hash tables are described in the literature (see Cormen, Leiserson, and Rivest, "Introduction to Algorithms", MIT Press, Cambridge, 1992, p. 221). The hash tables used in the present inventive method have two parameters: hash_size, which must be a prime number, and chain_size, which may be any number, but preferably is sufficiently large to avoid overflow. For example, a suitable hash_size may be 1217 and a suitable chain_size may be 160. The hash table is created as a linear array of (hash_size * chain_size) number of four-byte entries. A much more than adequate table for 12-bit I and O values is given by hash_size=1217 and chain_size=160, leading to a size of 1217*160*4=779 kilobytes per histogram, which is less than five percent the size of the corresponding "brute-force" 2D array.

It is assumed that all possible values of I and O, for any (I,O) pair, require no more than 12 bits of storage (i.e., I and O must be smaller than 4096), and that their histogram frequencies require no more than 8 bits of storage (i.e., must be smaller than 256). Note that if a particular application requires larger dynamic ranges, the method described herein may be easily modified to accommodate such changes by increasing the size of each entry in the hash table. Such changes are easily performed by one skilled in the art. The four bytes (32 bits) of each histogram entry are organized as follows:

12 bits for I 12 bits for O 8 bits for the frequency of the (I,O) pair

The pseudocode for the hash tables/histograms for the present inventive method is shown below. Each hash table corresponds to one segment histogram.

Pseudocode to create a hash table histogram let table = array of long integers (each four bytes wide), of size
    (hash_size * chain_size)
(hash_size and chain_size are assumed to be global constants)

Pseudocode to clear all entries in a histogram

```
let i = 0
let sentinel = 0xFFFFFFFF
while (i < hash_size * chain_size)
{
    let table[i] = sentinel
    let i = i + 1
}
```

Pseudocode to hash an (I,O) pair for entry into a histogram

```
Input: I and O
let num = (((long) I) << 20) | (((long) O) << 8)   //"<<" is
                                                "bit-shift-left"
let i = (num % hash_size)*chain_size        //"%" is "modulo"
num is the hashed (compressed) value of the (I,O) pair
i is the index into the hash table for the (I,O) pair
```

Pseudocode to set (the frequency of) an (I,O) pair
in a histogram to a given amount

```
Input: I and O, amount
let i = hash index of (I,O)
let num = hash value of (I,O)
let sentinel = 0xFFFFFFFF
let j = i
while j <i + chain_size)
{
    if(table[j] & 0xFFFFFF00) equals num)  // & is bit-wise AND
    {
        let count = table[j] & 0x000000FF
        if(amount + count > 255)
            let count = 255
        else
            let count = count + amount
        let table[j]= table[j] & 0xFFFFFF00) + count
        stop execution
    }
    else if (table[j] equals sentinel)
    {
        if (amount > 255)
            let amount = 255
        let table[j] = num + amount
        stop execution
    }
    let j = j + 1
}
print error message
```

Pseudocode to get (the frequency of) an (I,O) pair in a histogram

```
Input: I and 0
let i = hash index of (I,O)
let num = hash value of (I,O)
let sentinel = 0xFFFFFFFF
let j = i
while (j < i + chain_size)
{
    if (table[j] equals sentinel)
        return 0
    else if ((table[j] & 0xFFFFFF00) equals num)
        return (table[j] & 0x000000FF)
    let j = j + 1
}
return 0
```

Pseudocode to clear (delete) an (I,O) pair in a histogram

```
Input: I and 0
let i = hash index of (I,O)
let num = hash value of (I,O)
let sentinel = 0xFFFFFFFF
```

-continued

```
let j = i
while (j < i + chain_size)
{
    if ((table[j] & 0xFFFFFF00) equals num)
        break out of while loop
    let j = j + 1
}
while (j < i + chain_size)
{
    if (j equals i + chain_size - 1)
    {
        let table[j] = sentinel
        stop execution
    }
    else
    {
        if (table[j] equals sentinel)
            stop execution
        let table[j] = table[j + 1]
    }
    let j = j + 1
}
```

The use of hash tables to represent histograms is not known to be described in the prior art. Such use of hash tables provides a way to quickly and easily store (I,O) pixel intensity pairs for lookup and comparison. Collections of such (I,O) pairs are individually associated with each segment of the contour by associating a separate histogram (hash table) with each segment.

(I,O) Pairs

Each crack of the contour generates a single (I,O) pair, which is entered into the histogram for the contour segment in which the crack lies. Thus, an (I,O) entry in a segment histogram is preferably incremented by one each time that (I,O) pair is calculated for a crack in the contour segment. For each such (I,O) pair, "I" must contain information about pixel intensities interior to the crack, and "O" must contain information about pixel intensities exterior to the crack. Referring now to FIG. 11, several different ways are shown by which to determine an (I,O) pixel intensity pair for a given crack "c." In one method, as labeled with the reference letter "A", in FIG. 11, a pair of pixels with one interior pixel and one exterior pixel is used, where each pixel lies along c's radius relative to the centroid. In another method labeled with the reference letter "B", several such pixels are used where the values of the pixel intensities are averaged. This method is set forth below in greater detail. Further, an assortment of pixels at various locations may be used where the pixel intensities are again averaged, as labeled with the reference letter "C". The preferred method, indicated by reference letter B in FIG. 11, and referred to as "method B," is set forth in detail below as follows: 39

Method B

1) Given a crack c in the contour,

2) Find the average pixel intensity I of some pixels interior to c, lying along c's radius relative to the centroid. The preferred number of such pixels is three, where the central pixel is inset at a distance of five radial units from c. However, other numbers may be chosen depending on the application.

3) Repeat for several (preferably three, outset by a distance of five) pixels exterior to c to find O.

4) Check I and O against prior domain knowledge (for example, if it is known that the inside should always be brighter than the outside, then ignore (I,O) pairs where I is less than O; or, if it is known that I and O should always differ by a minimum amount a, then ignore (I,O) pairs where |I−O|<a). This is an example of using a priori domain knowledge to guide the segmentation process, and is a clear example of a place where such knowledge is embodied in or provided to the present inventive method as a set of one or more rules (FIG. 1 step 30).

5) Place the (I,O) pair into the histogram for the segment in which c lies: that is, increment the histogram's frequency count for the (I,O) pair.

The pseudocode to locate a crack—and therefore a pixel (since each crack corresponds to a pixel)—utilized above by steps 2 and 3, is shown below. Steps 1 through 3 above are used to the calculate the (I,O) pair for a crack without placing the pair into a histogram. Steps 4 through 5 above place the calculated (I,O) pair into a histogram, if the pair satisfies the constraints of prior domain knowledge.

---

Pseudocode to compute the angle of a crack relative to the centroid

Input: (x,y) coordinates of a crack
let angle = (180/PI) * arctan(|y−centroidY| / |x−centroidX|)
if ( (x equals centroidX) and (y > centroidY) )
   angle = 90
else if ( (x equals centroidX) and (y < centroidY) )
   angle = 270
else if ( (x < centroidX) and (y > centroidY) )
   angle = 180 − angle
else if ( (x < centroidX) and (y ≦ centroidY) )
   angle = 180 + angle
else if ( (x > centroidX) and (y < centroidY) )
   angle = 360 − angle
else if ( (x equals centroidX) and (y equals centroidY) )
   angle = 0
if (angle < 0)
   print error message and let angle = angle + 360
if (angle ≧ 360)
   print error message and let angle = angle − 360
angle is now the desired quantity Pseudocode to compute the radius of a crack relative to the centroid Input: (x,y) coordinates of a crack
return the square root of $(x - centroidX)^2 + (y - centroidY)^2$ Pseudocode to compute the (x,y) coordinate of
   a crack at a given angle and radius Input: radius and angle
let r = (PI/180) * angle
let x = centroidX + floor(radius*cos(r))  // floor(n) =
   largest integer that is no larger than n
let y = centroidY + floor(radius*sin(r))
(x,y) are now the desired quantities

---

(I,O) Pair Lookup Tables

As described hereinafter, it necessary to be able to determine (I,O) pairs during the search process, as well as during the construction of segment histograms. A preferable method to perform this task is described below.

The method for calculating (I,O) pairs described above in steps 1–3 requires time-consuming trigonometric operations, since for every crack in the contour, a number of pixels must be located using trigonometry before their intensities can be averaged into the crack's (I,O) pair. On the positive side, since a constant number of pixels is examined for every crack, the (I,O) pair for any particular crack is determined in O(1) or constant time.

The number of trigonometric operations involved in calculating (I,O) pairs is minimized by constructing a lookup table of (I,O) pairs for every possible crack in the image before contour searching commences. In this method, two 2D arrays are created: a 2D array for I values and a 2D array for O values. Each array location (x,y) corresponds to the crack at location (x,y) in the image associated with the contour. Since each crack lies at the upper-left corner of a pixel, each (x,y) also corresponds to pixel (x,y) in the image. In other words, location (x,y) in the I-array contains a precomputed I value for the crack/pixel at location (x,y) in the image, and similarly for the O-array. Using precomputed arrays (lookup tables) in this fashion removes the need to calculate (I,O) pairs constantly. For any crack (x,y), the (I,O) pair for the crack is obtained quickly simply by referencing the precomputed I-array and O-array. Thus, the use of trigonometry for (I,O) calculation is limited, occurring only when the lookup tables are built, just before searching begins.

However, there is a drawback with the lookup table method. For a given image, each (I,O) pair calculation is dependent on the centroid of the contour, and the centroid of a search contour can move about as time passes, since the search contour changes shape and position as its search progresses.

The solution to this problem is as follows. Prior to a contour search, an (I,O) lookup table is constructed that is based on the centroid of the training contour. The table is constructed before the contour search process begins. In other words, the calculated (I,O) pairs of the search contour at any point during the search are calculated based not on the true centroid of the (changing) search contour, but rather, on the (fixed) centroid of the training contour. This produces good results as long as the following conditions are true: 1) the search contour starts out fairly large and remains so as searching progresses so that the angles of its cracks relative to the centroid do not change significantly, and 2) the location of the centroid of the search contour does not wander too far from the location of the centroid of the progenitor training contour. In practice, both conditions will be met as long as the target object is of reasonable size and changes only gradually between the training and search images.

Empirically, using such a lookup table provides a great deal of execution time speedup without noticeable deterioration in segmentation quality. The time required to obtain the (I,O) pair of a crack is extremely fast, as no floating point or iterative computer calculations are performed. The code to construct such a lookup table is readily written by one skilled in the art, and therefore is not described here. If it is known that the search contour (or target object) will always be bounded by certain coordinates in all of the images (for example, will always lie only in the lower-left corner), then building the lookup table may be further speeded by calculating (I,O) pairs only for pixels in the bounded coordinate region.

The (I,O) lookup table is only used during searching. An (I,O) lookup table is not used or precomputed when constructing the segment histograms of a contour, since in this case, accuracy of the (I,O) pairs is very important (it is training information which must be accurate). When computing histograms, (I,O) pairs are calculated using trigonometry, as described above (Method B). Because histograms are only determined once per image, the total time spent building them is small.

An (I,O) lookup table is also not used if it is known that the centroid of the target object moves appreciably from image to image, since in this case, using a lookup table based on the centroid of the training contour is a poor approximation to the real (I,O) pairs based on the centroid of the search contour. If the centroid of the target object moves appreciably from image to image, then (I,O) pairs must be constantly recalculated (using trigonometry operations, steps 1–3 of Method B, above) when determining histogram matches.

This causes an increase in processing time. However, because a fixed number of pixels is averaged when determining an (I,O) pair, such determination takes O(1) or constant time. Thus, the increase in operating time is not severe. The present inventive method is meant to be applied to sets of images in which the appearance of the target object changes gradually, so that the (I,O) lookup table method is generally applicable.

Placing (I,O) Pairs into Histograms

Figure 12:
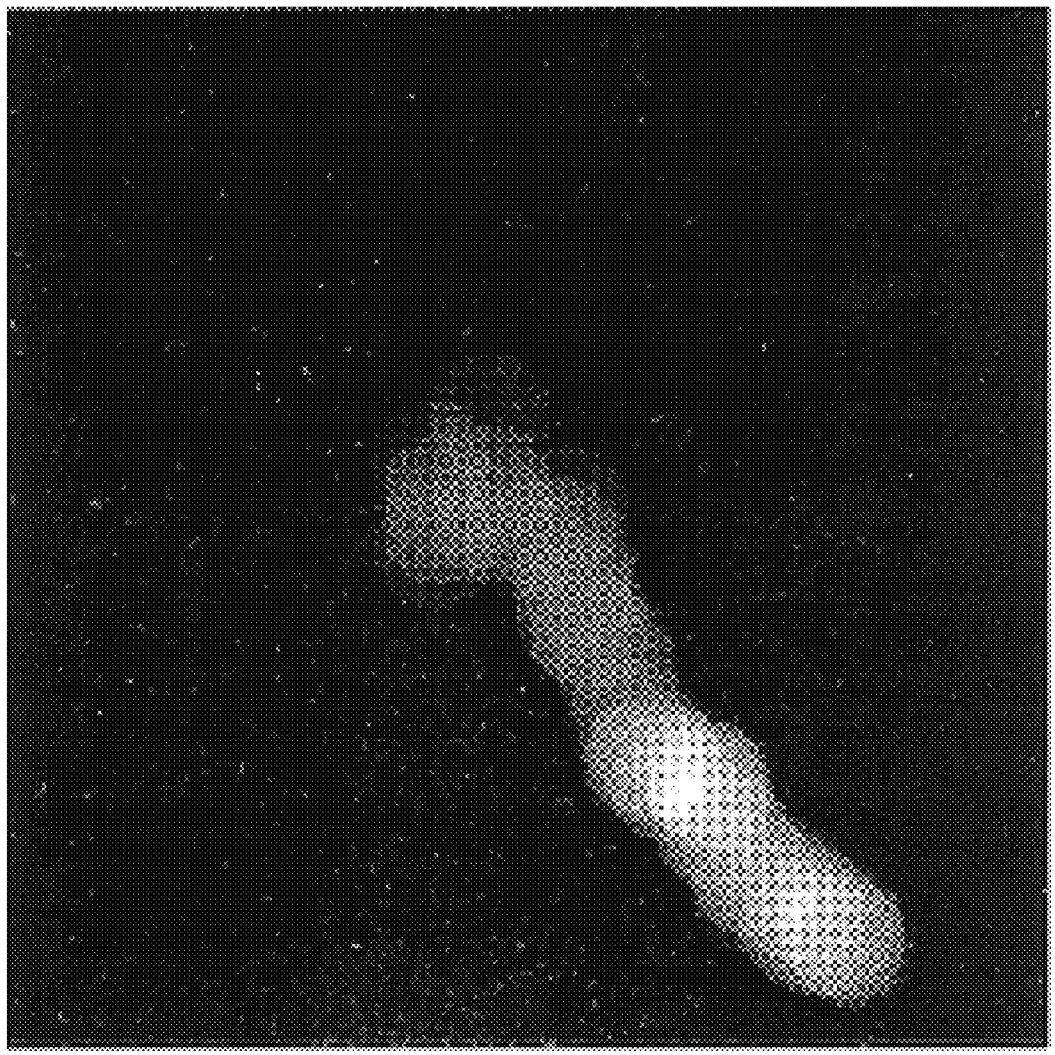
FIG. 12 is a drawing showing a blurred histogram.

Once the (I,O) pair for a particular crack has been determined, the final step is to determine what frequency value it should receive in the histogram, and whether nearby or similar (I,O) pairs should also be inserted into the histogram. This process (step 5 of Method B described above) is referred to as "blurring." It has been empirically determined that incrementing the (I,O) count in the histogram by one, and in addition incrementing all nearby (I,O) values within a circle of some predefined radius in the (I,O) domain (the "blurring radius"), is the preferred method. For example, if the (I,O) pair (10,20) is chosen to be inserted into a segment histogram, and the blurring radius is 5, then all (I,O) pairs that lay within the circle of radius 5 centered at (10,20) (including, for example, (9,20), (10,19), (10,21), etc., as well as (10,20) itself), are incremented by one in the histogram. A histogram blurred in this fashion is shown in FIG. 12. The preferred blurring radius is heavily dependent on the application, but an acceptable value is 10.

Alternate variations on blurring have been investigated, such as, including all pairs that lay within a square rather than a circle (this produces poor results), or incrementing pairs closer to the center of the blurring circle by a larger amount that those further away (this does not significantly change the results), or "hollowing out" the center of the blurring circle (this produces poor results). Blurring is desirable because as the present inventive method moves from image to image, it is likely that the relative pixel distributions of each image will not remain the same, but will drift slightly. Blurring compensates for this.

Histogram Overlap

As described above, the contour is divided into some number of segments, for example eight, and each segment has a corresponding histogram. The act of establishing these histograms is called "training" the contour. In other words, the contour is trained as follows: first all the segment histograms are cleared (all entries are set to a value of zero). Then, for every crack "c" in the contour, the (I,O) pair corresponding to c is computed, and that (I,O) value is entered into the histogram of the segment in which c lies, using appropriate modifications such as blurring.

The histograms for a search contour (as opposed to a training contour) are not updated or changed. Specifically, the search contour histograms are not updated because the search contour is trying to find an outline whose localized pixel intensity distributions match up closely with the training contour's segmental histograms. The histograms of a training contour describe the "colors" (intensities) of pixels that surround each segment of the training contour in the training image. When the training contour is associated with the search image, thus becoming a search contour, it tries to "wander" and "reshape" itself into a new contour whose segments show a similar distribution of pixel "colors" in the search image as the training contour did in the training image. Thus, the search contour attempts to locate the target object in the search image, by finding something that "looks" similar in both the training and search images.

By definition, a search contour crack "matches" if its (I,O) pair has a non-zero entry in the histogram for the segment in which the crack lies. (As described above, each crack's (I,O) pair is preferably found from a precomputed lookup table during search, but may also be calculated anew using trigonometry operations.) A non-zero histogram entry, or match, means that the crack in question exhibits a similar localized pixel intensity distribution as some other crack did in the same segment of the training contour. The more cracks that match in a segment of a search contour, the more the segment as a whole "looks like" the equivalent segment of the training contour in the training image. Thus, the search procedure (described below) is directed toward increasing the amount of matching of the cracks in the search contour.

A crack may be checked against prior domain knowledge before being allowed to match. For example, if the pixels immediately on either side of the crack differ by less than a predetermined amount, so that the crack does not lie on a clear boundary, the crack is rejected for matching. This is an example of using a priori domain knowledge, or rules, to guide the segmentation process.

Let N be the number of segments into which the contour is divided. An array of integers is created, referred to as "overlap," containing N entries. The value of overlap[i] is set to contain the sum of all the histogram entries of all the (I,O) pairs for all the cracks in segment i. For example, if the first crack in segment three has an (I,O) pair of (20,30), and if the histogram for segment three has a value of 5 for entry (20,30), then overlap[3] is equal to the number 5 plus the similarly computed histogram entries for all the other cracks of segment 3.

The overlaps measure the degree to which the pixel intensity distributions of the search contour match the contour histograms, and so indirectly, the pixel intensity distributions of the progenitor training contour. The larger the value of overlap[i], the more closely segment i exhibits a similar pixel intensity distribution to histogram i directly, and to segment i of the training contour in the training image indirectly. This is the basis of gradient search, described below.

A variable, referred to as "totaloverlap" is maintained. This variable is the sum of overlap[i] for all i. It is shown below that all the overlap[i] and totaloverlap values can be updated in O(1) time for the majority of contour moves. The larger the value of totaloverlap, the more closely the overall search contour resembles the overall training contour in terms of pixel intensity distributions.

Note that the contour can be trained (that is, its histograms initialized) using one particular method of calculating (I,O) pairs, but a different particular method of calculating (I,O) pairs can be used in creating the (I,O) lookup table used during searching or to find (I,O) values "on the fly" if a lookup table is not used during searching. For example, during training, many pixels surrounding each crack may be averaged into the crack's (I,O) pair so as to average out or "smooth" the amount of "noise." However, during searching only a few pixels may be averaged into the (I,O) pair so as to find a sharp boundary.

Contour Moves

In the present inventive method, a search contour is deformable, that is, it "moves around," and may change shape like a rubber band or an amoeba. By definition, if a contour is moving, it must be a search contour that is seeking to locate a target object in a search image. Defined below are examples of possible "moves," or "deformations," that a contour of the present inventive method may make. Such moves or deformations permit the search contour to describe, outline, or delineate, variable regions of the search image.

Note that when a move is made, it is checked for geometric consequences. For example, if the move would send part of the contour beyond the image boundaries, the move is rejected. Similarly, if it is known that the size of the target object doesn't change much from image to image, then a move that causes the area of the search contour to become, for example, 10% larger or smaller than the area of the training contour, is rejected. Other geometric constraints may easily be added if desired. Performing geometric checks decreases the processing time required and/or increases accuracy, if something about the target(s) being searched for is known. This is yet another example of using a priori knowledge, preferably in the form of rules, to guide the segmentation process.

It is also possible to freeze (prevent from moving) certain cracks, for example, if they exhibit especially strong histogram matching. For example, if a crack's (I,O) entry in the segment histogram is larger than 100, it may be frozen. Empirically, no significant advantage has yet been found in freezing cracks, since erroneous cracks may still exhibit strong matching. However, it is contemplated that freezing will be useful in applications where portions of the target object are much brighter than, or otherwise very distinct from, their surroundings.

Simple move

Figure 13:
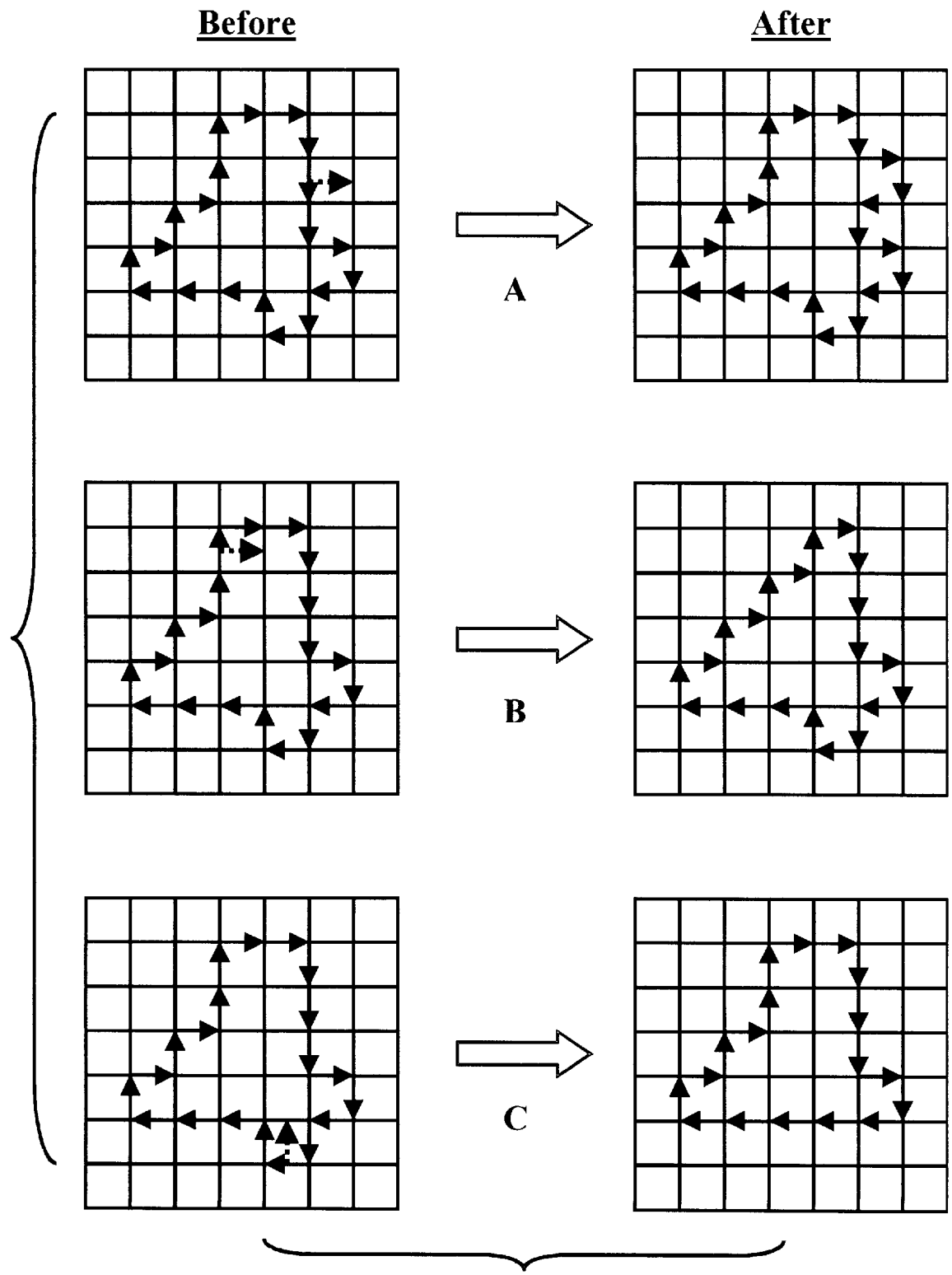
FIG. 13 is a drawing showing examples of simple moves.

In a simple move, a single crack of the search contour is pulled or pushed out of its original position. This is like placing a rubber band on a table and "poking at it." In a simple move, by definition, no self-intersection of the contour occurs. Therefore, only the crack that is being emptied (moved from), the crack that is being filled (moved to), and the two immediate neighbor cracks are changed, as shown in FIG. 13. In FIG. 13, the two drawings in each row show "before and after" representations of a contour where a single simple crack deformation is performed. Reference letters A, B, and C, indicate three different examples of moves.

It is important here to note that both the global and local information that is maintained about the contour is chosen to be linearly superposable across cracks. In other words, each crack's contribution to contour information may be calculated, added, or subtracted independently of all other cracks. This means that if a single crack in the contour is modified in some way, then any contour information dependent on it may be updated without worrying about any other cracks in the contour. In other words, such updating takes O(1) or constant time to perform. This is in direct contrast to many instances of the prior art, in which individual movement iterations do not require O(1) time, but rather, require O(n) time, and are therefore much slower.

Referring again to FIG. 13, in a simple move, a crack in the search contour is pulled or pushed from an original position to a new position by one horizontal or vertical distance unit. The crack is erased from the original position, and entered into the new position. In addition, two neighbor cracks must also be individually filled or erased in such a way that contour continuity is maintained. Therefore, in every simple move, a total of four crack updates must be performed. Since four is a constant number, each simple move takes O(1) or constant time.

For example, given a contour with area a, in a simple move, if a crack is pulled inward, that is, if any crack is pulled inward, a must shrink by one. If a crack is pulled outward, a must increase by one. The area of the contour is not recalculated from all the cracks in the contour. This tremendously decreases processing time. Similarly, the length of the contour may be updated in O(1) time by incrementing the length by one when a crack is filled and decrementing the length by one when a crack is erased. Because each simple move involves four such fills and erases, updating the length takes constant or O(1) time. The length is not recalculated from all the cracks in the contour. If the centroid does not move, then the overlaps, the average radius, and all variables of interest, are updated in O(1) time, as demonstrated in the pseudocode shown below. This significantly decreases processing time.

If the centroid does move, then some problems are introduced because the segments may shift, and the average radius may change. To maintain accuracy, we must update the overlaps and the average radius, in worst-case O(n) time. This causes an increase in processing time. However, this problem is solved by noticing that even if the centroid moves, it can move by a distance of no more than one pixel, since each simple move causes a crack to move no more than one horizontal or vertical unit of distance. The error introduced by "pretending" that the centroid did not move is negligible, assuming that the contour is reasonably large. As long as the centroid does not wander from its original position by a predefined threshold number of pixels, it is acceptable to assume that is has not moved at all. In this case, all variables are updated in O(1) time. However, if centroid movement is greater than the threshold value, all variables are updated in O(n) time. It has been found empirically that using a threshold value of only two pixels causes tremendous increase in processing speed with little change in final results. An increase in processing speed of about three times (300 percent) is realized using a threshold value of two pixels.

Any simple move of crack "c" may be "undone" or reversed by moving c in the reverse direction of the original move. To this end, the contour maintains variables UNDO_X, UNDO_Y, and UNDO_D which store information about the last simple move performed (its location and direction). "Undoing" is a very useful property in gradient search, as described and shown in pseudocode below.

To reiterate: the vast majority of simple moves, as defined above, may be performed in O(1) time. A small percentage of such moves requires O(n) time so as to maintain accuracy. It is clear that any contour may be generated from any other contour by a series of simple moves.

Complex move

Figure 14:
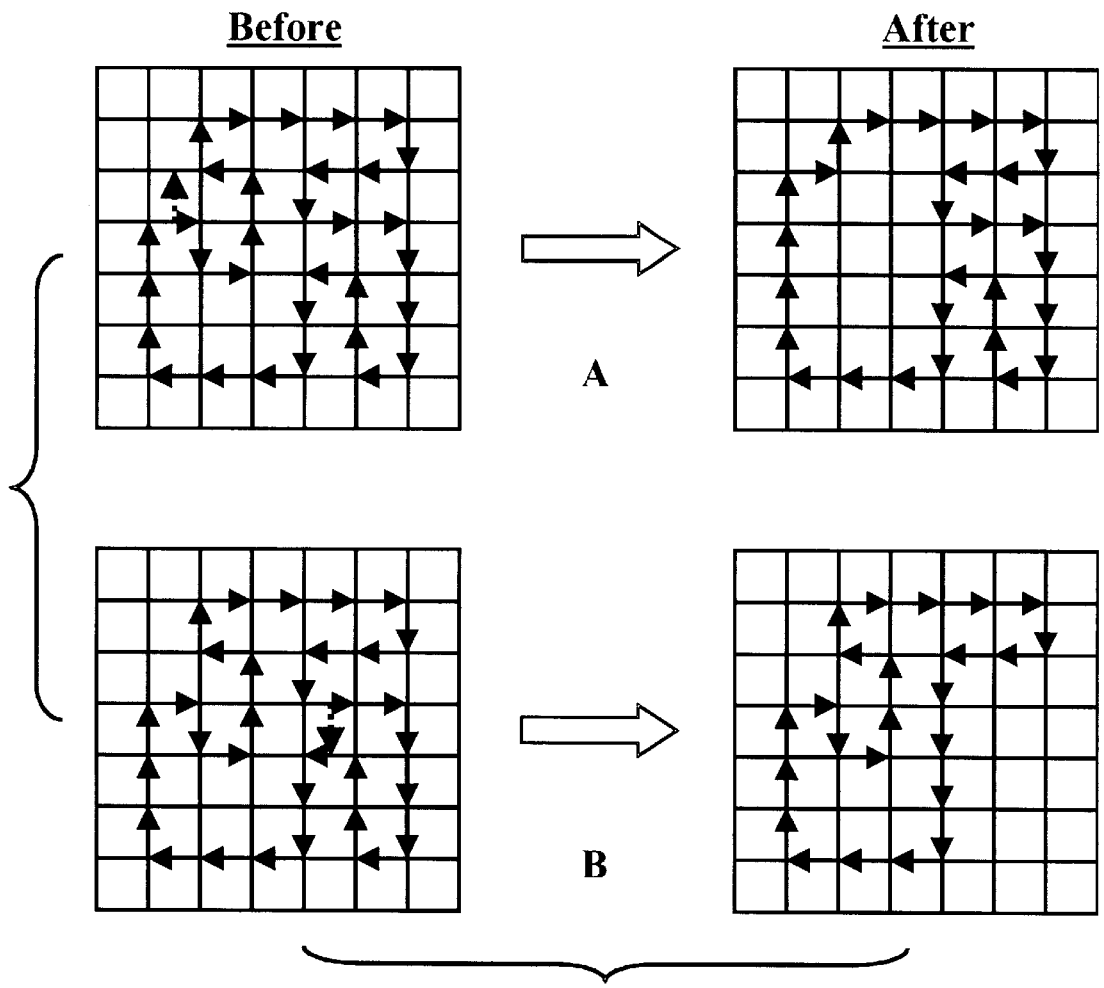
FIG. 14 is a drawing showing examples of complex moves.

In a complex move, a single crack of the contour is again pulled or pushed from its original position by a horizontal or vertical distance of one unit. However, in this case the move generates a self-intersection, that is, the contour attempts either to cross over itself or form a four-way node, which is not permitted under the present definition of a contour. In this situation, a contour "loop" must be erased, as shown in FIG. 14. The two drawings of each row in FIG. 14 show "before and after" representations of a contour where a complex move has created an illegal condition (before), and the condition is corrected (after). Because there is no way to predict how much of the contour will be affected, such complex moves require, in the worst case, O(n) time because the entire contour must be updated.

The present inventive method accommodates these types of moves. However, these moves are not very useful in general. Although they allow for "jumps" in the shape of the contour, the processing overhead reduces processing efficiency. If a large portion of contour is erased, the contour can actually reverse direction after a complex move. Also, it is difficult and time-consuming to "undo" a complex move.

A solution to the O(n) running time problem, therefore, is to disallow complex moves, and this is the preferred method.

However, it is contemplated that there are certain situations where complex moves are useful. For example, in applications where it is easy for a search contour to fall into a very deep local minimum while undergoing gradient search (described below), the ability to "jump" into an alternate configuration allows the contour to escape the local minimum. In general, however, complex moves are not "worth" the cost in processing time that they incur.

Figure 15:
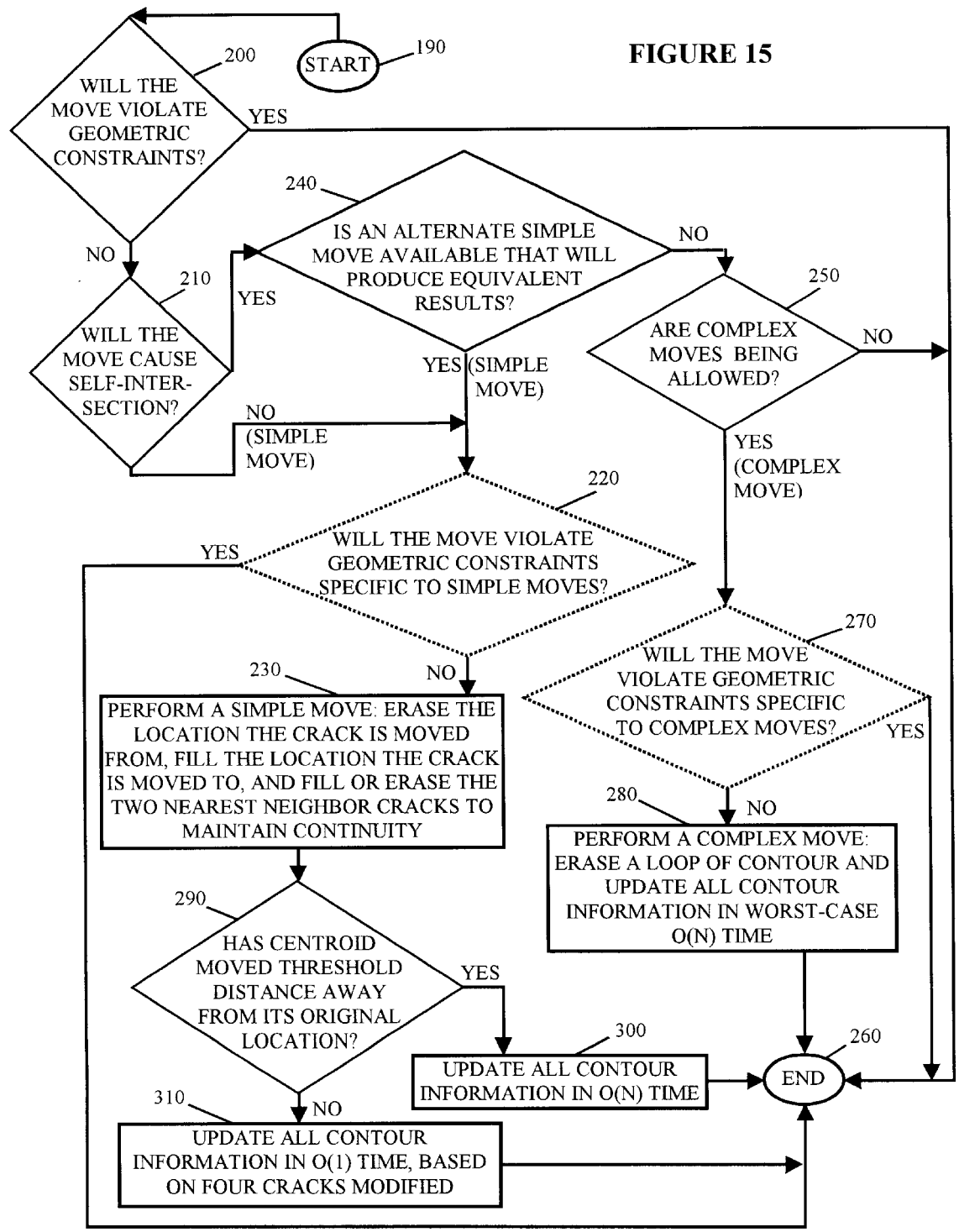
FIG. 15 shows a flowchart of contour movement according to a specific embodiment of the present inventive method.

A flowchart describing the overall process of performing a contour move is shown in FIG. 15. Such contour moves represent most of the processing corresponding to step 90 of FIG. 1, where the search contour "moves around" on its associated search image. The flowchart shows the steps performed in attempting to move a crack from one crack coordinate to an adjacent horizontal or vertical crack coordinate. In step 190, the processing begins and in step 200, the move is first checked for geometric constraints. For example, if the move would overstep the image boundaries, the move is not performed.

In step 210, the move is checked to determine if it would generate a self-intersection. If not, a "simple move check" is optionally performed, as shown in step 220. If the simple move check is successful, the simple move is performed, as shown in step 230. If the move would generate a self-intersection, as determined in step 210, then step 240 is performed to check if an alternate simple move is available that would produce the same final contour shape. If an alternate single move is available, then step 220 is performed. A simple move check in step 220 would reject the crack crossing past a forbidden boundary or radius, for example.

If there is no alternate simple move available, as shown in step 240, flow proceeds to step 250, which checks to determine if complex moves are permitted. If complex moves are not permitted, the process ends, as shown in step 260. If complex moves are permitted, a "complex move check" is performed, as shown in step 270, which optionally checks for any geometric constraints which may be specific to complex moves. For example, a complex move that would result in erasure of a loop of length larger than half the contour is rejected. If no constraints are violated, the complex move is performed, as shown in step 280, and processing terminates, as shown in step 260.

After a simple move has been performed, as shown in step 230, the centroid is checked to determine if it has moved from its original location by more than a predetermined distance, as shown in step 290. If the centroid has moved by more than the predetermined amount, the entire contour is updated as shown in step 300. This requires O(n) time to process because it depends on the number of cracks in the contour. Once the contour has been updated in O(n) time, the process terminates, as shown at step 260. 10 However, if the centroid has not moved by more than the predetermined amount, as shown in step 290, the contour information is updated with respect to the four cracks that have been modified in O(1) time, as shown in step 310. The process then terminates, as shown in step 260. Pseudocode to move a crack (perform a contour deformation) is shown below.

---

Pseudocode to perform a contour move

---

Input: (x, y), the location of the crack being moved
    move, the direction in which to move the crack
let raresituation = FALSE
if (the crack is marked "frozen" and so prevented from moving)

-continued stop execution
let d = crack value at (x,y)
if (d equals EMPTY)
    print error message and stop execution
if (move equals d) or (move equals REVERSE(d))
    print error message and stop execution
let (newX,newY) be the coordinate where the crack is being moved to
    (determined by x,y, and move)
check for geometric constraints applicable to both simple
    and complex moves
(example: check if new radius is larger than predetermined threshold)
if the check fails, stop execution
let rd = REVERSE(d)
let rmove = REVERSE(move)
let (x1,y1) be the coordinate the newly moved crack will point to
let d1 = crack value at (x1,y1)
if (d1 equals rd)
    perform complex move
else
    perform simple move

---

Pseudocode to perform a complex move

--- if (length ≦ 4)
    stop execution
if (we are not allowing complex moves)
    {
    let distance = number of cracks between (x,y) and (newX,newY)
    if (distance < 4)
        {
        let (x,y) be the crack pointed to by (x,y)
        let d be the crack value at (x,y)
        let d = REVERSE(d)
        recursively call move routine, moving crack (x,y) in direction d
        }
    stop execution
    }
fourway:    // this is a label referenced by GOTO
let distance =
    number of cracks between (x,y) and (newX,newy)
if (any cracks between (x,y) and (newX,newY)
        have been marked "frozen")
    stop execution
if (distance < 4) and (not raresituation)
    {
    let (x,y) be the crack pointed to by (x,y)
    let d be the crack value at (x,y)
    let d = REVERSE(d)
    recursively call move routine, moving crack (x,y) in direction d
    }
check for geometric constraints specific to complex moves
(example: check if an erased loop would be too large)
if check fails, stop execution
set all cracks between (x,y) inclusive and
    (newX,newY) noninclusive to EMPTY
set the crack value of (x,y) to move
let length = length − distance + 1
let startX = x
let startY = y
recompute centroid, overlaps, sumRadii,
    and area in worst-case O(n) time
    let (MOVE_X, MOVE_Y) be the crack obtained by moving in
    direction move from crack (startX, startY)
    if (raresituation equals TRUE)
    recursively call move routine, moving crack
    (x1,y1) in direction move

---

Pseudocode to perform a simple move

--- let (x2,y2) be the crack pointed to by: (x1,y1) with crack value d
if (crack value of (x2,y2) equals rd)
    {
    if (complex moves are not allowed)
        stop execution
    let newX = x1
    let newY = y1
    let x1 = x
    let y1 = y
    let (x,y) be the crack pointed to by (x,y)

-continued

```
        let raresituation = TRUE
        goto fourway
        }
if (crack value of (newX,newY) equals rd)
    {
    if (complex moves are not allowed)
        stop execution
    goto fourway
    }
check for geometric constraints specific to simple moves
(example: check if new radius would deviate too far from the average)
if check fails, stop execution
if ((newX,newY) is marked "frozen" and its crack value equals rmove)
    stop execution
let (x2,y2) be the crack pointed to by: (x,y) with crack value d
if ((x2,y2) is marked "frozen" and its crack value equals move)
    stop execution
if (move equals TURN_RIGHT(d))
    let area = area - 1
else
    let area = area + 1
locally update (x,y) with erase = TRUE
let updateXY = FALSE
if (crack value of (newX,newY) equals rmove)
    {
    locally update (newX, newY) with erase = TRUE
    let length = length - 1
    set crack value of (x,y) to EMPTY
    let sumX = sumX - x
    let sumY = sumY - y
    }
else
    {
    set crack value of (x,y) to move
    let length = length + 1
    let sumX = sumX + newX
    let sumY = sumY + newY
    let updateXY = TRUE
    }
let updateX1Y1 = FALSE
let (x2,y2) be the crack pointed to by: (x,y) with crack value d
if (crack value of (x2,y2) equals move)
    {
    locally update (x2,y2) with erase = TRUE
    set crack value of (x2,y2) to EMPTY
    let length = length - 1
    let sumX = sumX - x2
    let sumY = sumY - y2
    }
else
    {
    set crack value of (x1,y1) to rmove
    let length = length + 1
    let sumX = sumX + x1
    let sumY = sumY + y1
    let updateX1Y1 = TRUE
    }
set crack value of (newX,newy) to d
let oldCentroidX = centroidX
let oldCentroidY = centroidY
let startX = newX
let startY = newY
let UNDO_X = newX
let UNDO_Y = newY
let UNDO_D = rmove
let (MOVE_X, MOVE_Y) be the crack pointed to by:
    (startX,startY) with crack value d
let newCentroidX = sumX/length
let newCentroidY = sumY/length
if (newCentroid differs from oldCentroid
        by more than a predetermined threshold)
    update centroid, sumRadii, overlaps from scratch in O(n) time
else
    {
    locally update (newX, newY) with erase = FALSE
    if (updateXY equals TRUE)
        locally update (x,y) with erase = FALSE
    if (updateX1Y1 equals TRUE)
        locally update (x1,y1) with erase = FALSE
    }
```

-continued

```
Pseudocode to locally update a crack in O(1) time

Input: (x,y) location of crack, erase (either TRUE or FALSE)
let s = segment in which (x,y) lies
let v = histogram entry of (x,y) in histogram of segment s
let r = radius of (x,y) relative to centroid
if (erase equals TRUE)
    {
    let overlap[s] = overlap[s] - v
    let totaloverlap = totaloverlap - v
    let sumRadii = sumRadii - radius
    }
else
    {
    let overlap[s] = overlap[s] + v
    let totaloverlap = totaloverlap + v
    let sumRadii = sumRadii + radius
    }

Pseudocode to undo a simple move

Call the move routine to move crack (UNDO_X, UNDO_Y)
    in direction UNDO_D
```

There remains the issue of how to choose which crack of the contour should be moved at each iteration of the search method (which is described below in the section on gradient search), and the direction in which to move the crack. Choosing which crack to move is not particularly problematic as long as the location of the crack varies over the entire length of the contour as time passes, rather than being restricted to only one part of the contour. To ensure that this occurs, two variables (MOVE_X and MOVE_Y) are used to track along the contour from move to move. By choosing the crack (MOVE_X MOVE_Y) from move to move, we ensure that moves are distributed evenly along the contour. A random position along the contour at which to move may also be chosen, if desired, but this does not seem to be useful for any application.

The direction in which to move the crack depends on how the contour search is being performed. The direction of the crack move is either inward, outward, or random, depending on whether the contour is attempting to SHRINK, GROW, or move randomly. This is described further in the section on gradient search, below.

To summarize, most moves or deformations of the contour are simple moves that affect four cracks, and permit all pertinent information about the contour to be updated, with minor loss of accuracy, in O(1) time. A smaller percentage of moves, those in which the centroid has wandered far from its original position, require O(n) time for updating of the pertinent information. Moves in which the contour intersects itself require worst-case O(n) time, and therefore are preferably marked for automatic rejection. Alternatively, such moves may be allowed if the user is willing to accept slower processing time. The present inventive method of moving contours is both fast and highly efficient.

Gradient Search

The present inventive method uses a search contour to locate the target object in the search image. To find the target object, the search contour is "wriggled" or deformed, preferably using simple moves as described above, to permit it to seek the target. The measure of success of a search, at any particular point in the search, is dictated by the amount of overlap that the contour exhibits with its histograms, and the accordance of the contour's geometry with predefined (a priori) conditions. There remains the problem of how to direct the sequence of moves over time, such that the search contour possesses a strong likelihood of encountering the border of the target object in the search image as the search contour moves about.

The present inventive method uses a form of gradient search, to direct the search procedure. Gradient searches, in general, are known. Such searches usually consist of defining an "energy function" and then performing moves or calculations of some sort, which attempt to minimize this energy function. If such moves or calculations fail, they are rejected and different moves/calculations are employed instead, such that over time the "energy" decreases.

The method of gradient search method is set forth below in enumerated steps 1–4:
1) Save the current totaloverlap of the contour.
2) Perform a move.
3) Compare the new totaloverlap to the old totaloverlap.
4) If the new totaloverlap is less than the old totaloverlap: undo the move, if it was a simple move, or restore a saved copy of the original contour, if the move was a complex move.

A sequence in which all four steps, or step number two alone, are iteratively repeated, is referred to as a "cycle" of search. If all four steps are included, the sequence is referred to as a cycle of gradient search, or a cycle using gradient search. A cycle of gradient search is a standard so-called "downhill search" because it acts like a ball placed on a slope. Eventually the ball stops rolling because it reaches a minimum local height. In the same way, the contour wriggles until it reaches a local maximal overlap.

If the contour just "wriggles" randomly, it may make progress, but it is unlikely to find the target object unless the contour and target start out very close to each other. This is because random moves cause the contour to remain, on average, in the same position. Therefore, in the present inventive method, the contour is preferably constrained to only GROW or only SHRINK during each cycle of gradient search.

To show why this is, imagine that a book is suspended in midair, and imagine that we have a balloon having the property of being able to pass through solid matter. Imagine further that the sections of the balloon will stick to the surface of the book, becoming immobile if they contact the surface of the book. Now imagine that the balloon begins as a very large balloon so that it completely encloses the hovering book. If the balloon is continually shrunk, eventually all of the balloon will end up clinging to the surface of the book. Conversely, imagine that the balloon begins as a very small balloon so that it is completely within the interior of the book. Then, if the balloon is continually grown, it will again eventually end up entirely sticking to the surface of the book. Finally, imagine that the balloon begins partly inside and partly outside of the book. Then, if the balloon is first shrunk until it is no larger than the book, and then grown for a while, it will again, end up entirely stuck to the surface of the book.

The gradient search according to the present inventive method functions in this way. In general, the search contour may begin partly inside and partly outside the boundary of the target object. However, its histograms are set to detect the border of the target object. By subjecting the contour to gradient searches in which it alternately may only use SHRINK or GROW moves, the contour is permitted to "latch on to" the border of the object, regardless of starting position.

The choice of how long to SHRINK and how long to GROW, and how many times to repeat cycles of SHRINK-ING and GROWING, during the search portion of the segmentation process, is dependent on the application. Three possible variations, which do not constitute an exhaustive list, are as follows.

1) One SHRINK cycle is followed by one GROW cycle, where each cycle uses a gradient search and contains a sufficient number of moves to ensure that the search contour will be able to shrink or expand enough so that it encounters the border of the target object in the search image.

2) One SHRINK cycle without a gradient search (that is, without undoing any moves at all), containing a sufficient number of moves to force the search contour to be completely contained within the boundary of the target object, followed by one GROW cycle using a gradient search to find the boundary of the target object.

3) Some combination and/or concatenation of variations 1 and 2 described above. Empirically, the preferred method is number 3, but the exact number and types of cycles, and the number of moves per cycle, is heavily dependent on the application.

Alternation of search gradient cycles overcomes a common problem associated with known gradient searches. A single known gradient search can detect only the nearest local minimum. Alternating between growing and shrinking cycles essentially changes which way "downhill" lies, thus permitting the contour to "jump out" of a "bad" local minimum and find a better local minimum later on. While other instances of the prior art that use gradient descent sometimes employ methods of jumping out of local minima, no prior art methods change the downhill metric itself That is, no prior art methods switch the definition of downhill, allowing a search to maneuver around local minima.

With respect to gradient searches, the present inventive method does not seek a global minimum. Neither does it seek a local minimum corresponding to only one definition of "downhill." The search contour preferably alternately grows and shrinks, trying to maximize the degree of segmental matching with its training histograms according to gradient search. From cycle to cycle, it falls into different local minima. Thus, when all the cycles of gradient search are completed, the search contour has fallen into a local minimum in which both an expanding and a shrinking motion produce a high degree of histogram overlap.

The pseudocode for gradient search, assuming only simple moves, appears below. It is easily modified to allow complex moves as well, if desired. If a complex move is made, then instead of undoing the last move (which is difficult for a complex move), a saved copy of the contour before it performed the complex move must be restored.

---

Pseudocode to perform a gradient search,
    assuming only simple moves are allowed Input: n (the number of moves to make),
    h (either GROW, SHRINK, or RANDOM)
let i = 0
while (i < n)
    {
        let c = a contour crack, selected either randomly
            or deterministically
        let m = the direction in which to move c,
            calculated according to the value of h
        let oldoverlap = totaloverlap
        move c in the direction m
        let newoverlap = totaloverlap -continued

```
if (newoverlap < oldoverlap)    //the "<" may be replaced with "≦"
    undo the last move
    let i = i + 1
}
```

Contour Shaping

Isolating Strong Signal.

Due to factors such as the "noisiness" of typical images, changes in the target object from image to image, and errors in manually-supplied training contours, histogram information will not correspond perfectly to the "colors" around the target object's border from image to image. This means that the search contour will not, in general, latch on to the exact outline of the target object unless the pixel intensities of the target object are very clearly distinguishable from its surroundings. In such a case, excellent results are obtained after completing the gradient search, but such image quality is virtually nonexistent in real-world situations.

Sections of the border of the target object, as it appears in the search image, that exhibit very similar pixel intensity distributions to the search contour histograms are called areas of "strong signal." Areas of the border of the target objects that do not match well to the search contour histograms are called areas of "weak signal." Where the signal is strong, portions of the target object as it appears in the search image look very similar to homologous portions of the target object as it appears in the training image. During gradient search, the search contour will "stick to" areas of strong signal preferentially to areas of weak signal, because areas of strong signal will cause the histogram overlaps to increase significantly.

If the target object varies very gradually from image to image, we may expect strong signal. In other words, the distributions of "colors" inside and outside the border of the target object will be similar from image to image. However, if the target varies widely (due to magnetic inhomogeneity, fast rotation, long intervals between image capture, ghosting, etc.), the signal will be weaker. If you are looking for a particular person wearing a green jacket, you are likely to miss the same person in a red jacket.

In general, as long as the appearance of the target object in the search image is not significantly different from the appearance of the target object in the training image, sections of the contour will "lock onto" the correct target border. The term "lock onto" means that these sections will contain a high degree of overlap with the contour histograms, and therefore will "stick to" the outline of the target object during the gradient search. If a move occurs in which such a section leaves the target boundary, the amount of overlap will decrease and the move will be rejected.

Figure 16:
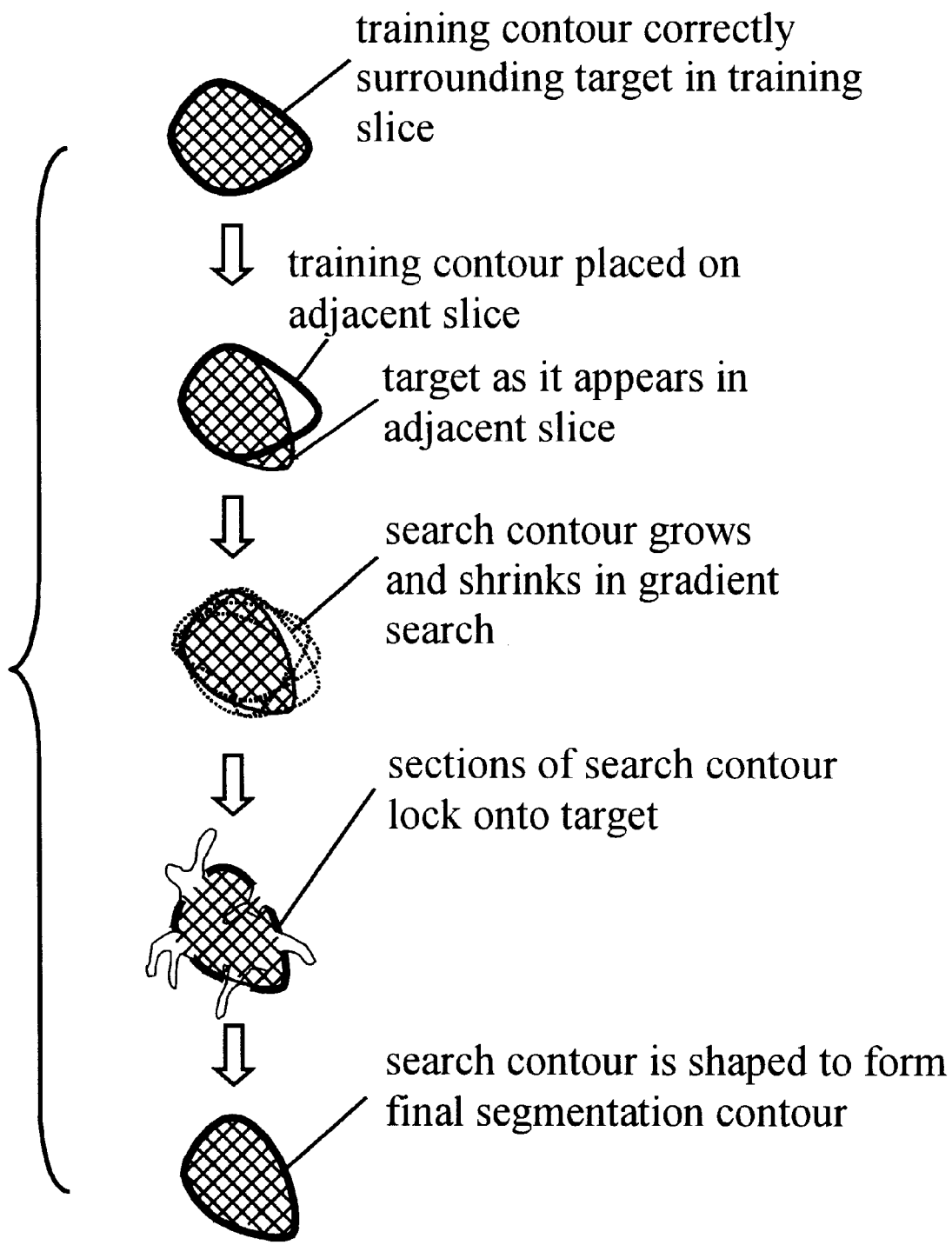
FIG. 16 is a drawing illustrating a gradient search and contour shaping.

This situation is shown in the sequence of shapes illustrated in FIG. 16. The process of determining which sections of the contour have successfully locked on to the target border, discarding other sections, and then using the locked-on sections to fashion a final target border, is referred to as "shaping."

There are two possible outcomes for sections of the search contour which have not locked-on to the correct target border once gradient search is finished:

1) They have locked-on to an area of histogram matching, but this area does not belong to the desired target object. Thus, an erroneous target boundary is found. This is more likely to happen when the signal is weak, because then erroneous areas of the search image are likely to have stronger histogram matches than the real signal.

2) They have not encountered an area of histogram overlap at all, and therefore sought without success during gradient search.

To handle the above-described situations, the present inventive method implements two specific techniques as follows, respectively:

1) Prior geometric and domain knowledge is used to mark all erroneous matching cracks for erasure. For example, if the target object is known to be round, a crack is marked for erasure if the crack radius is very different than the average radius of all nearby histogram-matching cracks. Heuristics and statistical methods may be used to perform this function. The exact method depends heavily on the application area. In particular, it depends on known characteristics of the target object. Once again, this is where domain-specific a priori information, preferably in the form of rules, is built into or provided to the present inventive method.

2) All aimless cracks are designated for erasure. It is a simple task to mark all cracks for erasure that do not exhibit a certain minimal match with their segmental histograms.

The cracks corresponding to the above-described undesirable cases are erased. The surviving cracks will, in general, not form a complete contour after the undesirable cracks are erased. The surviving cracks must to be connected to form a closed, non-self-intersecting contour.

At this point, all of the surviving cracks may be connected immediately. However, this tends to produce jagged, "ugly" segmentations, as if the segmentation had been done with a "tremor". Therefore, the surviving cracks are next subjected to "winnowing", that is, yet more cracks are removed, before the cracks that remain are connected. The step of winnowing averages or smoothes the contour, and in general produces better results. The preferred method of winnowing is as follows: divide the contour into any desired number of pie (angular) slices, for example, 30. Then keep the crack of largest radius in each pie slice, erasing all other cracks. Another method of winnowing, for example, is to calculate the average radius and angle of all the cracks in each pie slice, then use only the cracks corresponding to those averages (whether or not they are cracks that actually belong to the contour), erasing all other original cracks of the contour.

To form a complete (closed and non-self-intersecting) contour, the surviving cracks must be connected. A line cannot simply be "drawn" straight from one crack to another, because all cracks must follow the borders between pixels, and cannot create any contour intersections. In addition, the connections between successive cracks must be interpolated, or the contour may deviate significantly from the true target between sections of strong target signal.

Connect-The-Dots

The preferred method to form a complete contour from a disparate, unconnected collection of cracks is now described, and is generally referred to as "connect-the-dots," because this method basically draws connecting curves between successive pairs of cracks. This method utilizes several procedures or sub-methods, referred to as "Method A," "Method B." and "Method C," described immediately below. These methods are not to be confused with any other named methods described in other subheadings. Note that it is desirable to form each new connection between cracks using interpolation. Rather than just drawing a straight line from one crack to the next, it is preferable to draw a smooth, rounded curve. Interpolation provides such a smooth, rounded curve. Interpolation based on radial distance from the centroid is preferable. However, other suitable methods such as linear interpolation, polynomial interpolation, minimizing Manhattan distance, and the like, may be used. In such cases, the pseudocode provided below must be modified appropriately. Such modifications are readily performed by one skilled in the art.

According to a first method, referred to as method "A," shown below, two cracks "c1" and "c2" are connected without interpolation. This method is also used within method B, also described hereinafter.

Method A (connect two cracks without interpolation)

1) (Base case.) If c1 and c2 are within two pixels of each other, a lookup table is used to connect the two pixels. If the connection causes a self-intersection, an alternate connection is used if one exists. If no connection can be found that does not cause a self-intersection, the method returns a failure condition.

2) (Recursive case.) If c1 and c2 are separated by more than two pixels, an unoccupied midpoint "m" is chosen. If no such midpoint exists, the method returns a failure condition. Method A is then twice called recursively, first to connect c1 and m, and second to connect m and c2.

The pseudocode for Method A is as follows. The procedure incorporates a lookup table.

```
Pseudocode to find an unoccupied
crack midway between two cracks (used by method A)

Input: (x1,y1) and (x2,y2)
let halfx = (x2 − x1)% 2    // "%" is the modulo operation
lethalfy = (y2 − y1)% 2
letmix = x1 + ((x2 − x1)/2)
let midy = y1 + ((y2 − y1)/2)
let oldmidx = midx
let oldmidy = midy
if (crack value at (midx, midy) equals EMPTY)
        stop execution and return (midx,midy)
if (halfx doesn't equal 0)
        {
        let midx = oldmidx + halfx
        let midy = oldmidy
        if (not(((midx equals x1) and (midy equals y2)) or ((midx equals
x2)
                and (midy equals y2))))
                if (crack value at (midx, midy) equals EMPTY)
                        stop execution and return (midx,midy)
        }
if (halfy doesn't equal 0)
        {
        let midx = oldmidx
        let midy = oldmidy + halfy
        if (not(((midx equals x1) and (midy equals y1)) or ((midx equals
x2)
                and (midy equals y2))))
                if (crack value at (midx, midy) equals EMPTY)
                        stop execution and return (midx,midy)
        }
if (halfy doesn't equal 0) and (halfx doesn't equal 0)
        {
        let midx = oldmidx + halfx
        let midy = oldmidy + halfy
        if (not(((midx equals x1) and (midy equals y1)) or ((midx equals
x2)
                and (midy equals y2))))
                if (crack value at (midx, midy) equals EMPTY)
                        stop execution and return (midx,midy)
        }
return self-intersection error
        Pseudocode for method A: connect two cracks
        by a chain of cracks (without interpolation)

Input: (x1,y1) and (x2,y2)
if (x2 equals x1) and (y2 equals y1)
        stop execution
if (x2 equals x1 + 1) and (y2 equals y1)
        {
        if (crack value of(x2,y2) equals LEFT)
                stop execution and return self-intersection error
        else
                set crack value of(x1,y1) to RIGHT
        }
else if ((x2 equals x1 + 1) and (y2 equals y1 + 1))
        {
        if (((crack value of (x2,y1) equals LEFT) and (crack value of (x2,
y2) equals UP))
        or ((crack value of (x1,y2) equals UP) and (crack value of (x2,y2)
equals LEFT)))
                stop execution and return self-intersection error
        if (crack value of (x2,y1) equals LEFT)
                {
                set crack value of (x1,y1) to DOWN
                set crack value of (x1,y2) to RIGHT
                }
        else
                {
                set crack value of (x1,y1) to RIGHT
                set crack value of (x2,y1) to DOWN
                }
        }
else if ((x2 equals x1 + 1) and (y2 equals y1 − 1))
        {
        if (((crack value of (x2,y1) equals LEFT) and (crack value of
(x2,y2) equals DOWN))
        or ((crack value of (x1,y2) equals DOWN) and (crack value of
(x2,y2) equals LEFT)))
                stop execution and return self-intersection error
        if (crack value of (x2,y1) equals LEFT)
                {
                set crack value of(x1,y1) to UP
                set crack value of(x1,y2) to RIGHT
                }
        else
                {
                set crack value of (x1,y1) to RIGHT
                set crack value of (x2,y1) to UP
                }
        }
else if ((x2 equals x1) and (y2 equals y1 + 1))
        {
        if (crack value of (x2,y2) equals UP)
                stop execution and return self-intersection error
        set crack value of (x1,y1) to DOWN
        }
else if ((x2 equals x1) and (y2 equals y1 − 1))
        {
        if (crack value of (x2,y2) equals DOWN)
                stop execution and return self-intersection error
        set crack value of (x1,y1) to UP
        }
else if ((x2 equals x1 − 1) and (y2 equals y1))
        {
        if (crack value of (x2,y2) equals RIGHT)
                stop execution and return self-intersection error
        set crack value of (x1,y1) to LEFT
        }
else if ((x2 equals x1 − 1) and (y2 equals y1 + 1))
        {
        if (((crack value of (x2,y1) equals RIGHT) and (crack value of
(x2,y2) equals UP))
        or ((crack value of (x1,y2) equals UP) and (crack value of
(x2,y2) equals RIGHT)))
                stop execution and return self-intersection error
        if (crack value of (x2,y1) equals RIGHT)
                {
                set crack value of (x1,y1) to DOWN
                set crack value of (x1,y2) to LEFT
                }
        else
                {
                set crack value of (x1,y1) to LEFT
                set crack value of (x2,y1) to DOWN
                }
        }
else if ((x2 equals x1 − 1) and (y2 equals y1 − 1))
```

```
{
    if (((crack value of (x2,y1) equals RIGHT) and (crack value of
        (x2,y2) equals DOWN))
    or ((crack value of (x1,y2) equals DOWN) and (crack value of
        (x2,y2) equals RIGHT)))
            stop execution and return self-intersection error
    if (crack value of (x2,y1) equals RIGHT)
        {
            set crack value of (x1,y1) to UP
            set crack value of (x1,y2) to LEFT
        }
    else
        {
            set crack value of (x1,y1) to LEFT
            set crack value of (x2,y1) to UP
        }
}
else
{
    let (midx,midy) be an unoccupied midpoint between (x1,y1) and
    (x2,y2) if there was no such midpoint, stop execution and return
        self-intersection error recursively draw lines between (x1,y1)
and (midx,midy), and between (midx,midy) and (x2,y2)
        if there was an error in drawing the lines, stop execution and
        return self-intersection error
}
```

The next method, referred to as method "B," shown below, is used to connect two cracks c1 and c2 with interpolation. Method B calls upon Method A, and Method B is in turn used by the method to perform connect-the-dots (Method C), described hereinafter.

Method B (connect two cracks with interpolation)

1) (Base case.) If the distance between c1 and c2 is small, for example, less than 8, the cracks are connected according to method A.

2) (Recursive case.) Otherwise, a new crack "m" is chosen such that its radius (distance from the centroid) is the average of the radii of c1 and c2, and such that its angle relative to the centroid is midway between c1 and c2. This method of interpolation has the effect of generating smooth curves between areas of strong signal. Other methods of suitable interpolation may also be used, as described above. Next, method B is twice called recursively, first to connect c1 and m, and second to connect m and c2.

Pseudocode for method B is as follows.

```
Pseudocode for method B:
connect two cracks by a chain of cracks (with interpolation)

Input: (x1,y1) and (x2,y2)
if (x1,y1) and (x2,y2) are closer than some predetermined margin (eg 8)
{
    connect them according to method A
    if method A fails, return failure
}
else
{
    let angle1 = angle of (x1,y1)
    let angle2 = angle of (x2,y2)
    let angle = (angle1 + angle2)/2
    if( |angle1 - angle2|>=180)
    {
        if(angle1 < angle2)
            let angle1 = angle1 + 360
        else
            let angle2 = angle2 + 360
        let angle = (angle1 + angle2)/2
        if(angle > 360)
            let angle = angle - 360
    }
```

```
Pseudocode for method B:
connect two cracks by a chain of cracks (with interpolation)

let r1 = radius of (x1,y1)
    let r2 = radius of (x2,y2)
    let r = (r1 + r2)/2
    let (x,y) be the coordinates of the crack specified by angle and r
    recursively connect with interpolation: (x1,y1) and (x,y), and (x,y)
    and (x2,y2) if a recursive call fails, stop execution and return
    failure
}
```

Method (B) for shaping the contour is not robust, since the method may return failure in the event of self-intersections. However, Method B performs well with real-world data. The main advantages of method B are that it is easy to implement and runs very quickly.

Finally, the following method is used to perform connect-the-dots between all of the disparate cracks left over after winnowing, thus forming a smooth, closed, non-self-intersecting contour.

Method C (connect-the-dots using interpolation)

1) Sort the collection of cracks in order of increasing angle (relative to the contour centroid).

2) Erase outlier cracks according to heuristics or geometry, if known. For example, a crack whose radius is much larger or smaller than the average of its neighbors may be erased. This is another place in which a priori domain-specific knowledge is applied.

3) Repeatedly using Method B (connection with interpolation), successively connect the cracks in order of increasing angle.

4) Using method B again, connect the first and last cracks in the collection.

5) If an error occurs at any time, return failure and restore the original contour.

This method (Method C) of connect-the-dots is not robust. It can fail in the event that one connecting line between two cracks crosses another connecting line. However, winnowing prevents such crossing from occurring in all but the most pathological cases. As long as there are a reasonable number of cracks to connect (at least approximately eight), and the cracks are not "jumbled" too closely together (a situation which winnowing prevents), this method of connect-the-dots produces excellent and fast results.

Alternate Method Of Connect-The-Dots Using Convex Hulls

An alternate method of connect-the-dots is more robust than the method described above, but is also more complicated. Its complexity, and few advantages, render it applicable only in very limited situations. The method is described briefly as follows. First, a convex hull of all the disparate cracks that need to be connected together is determined. The convex hull provides a minimal polygonal enclosing shape for a collection of points. Algorithms to calculate convex hulls are well described in the literature: see Cormen, Leiserson, and Rivest, "Introduction to Algorithms", MIT Press, Cambridge, 1992, p. 898. The line segments comprising the convex hull are modified using interpolation to provide smoothing. Finally, a contour describing the boundary of the convex hull is computed, yielding the final result.

This method avoids the problem of self-intersection, and is therefore more robust than the method described previously. However, this method is very complex. All operations involving the convex hull require standard coordinate geometry, instead of crack geometry (running along horizontal and vertical inter-pixel spaces), and the translations between the two geometric systems are very cumbersome and potentially inaccurate. Therefore, this method of connect-the-dots is not preferred.

Shaping Multiple Times

Shaping can applied multiple times if desired, using different criteria each time, in order to obtain better smoothing. For example, a first shaping may be performed that determines the histogram-matching crack of maximum radius in each of 30 pie slices, and connects the cracks so determined. A second shaping can then be performed that determines the crack corresponding to the average crack angle and crack radius in each of pie slices, and connects the cracks so determined. The first shaping produces a rough outline of the target object, with only a little jaggedness. The second shaping uses averaging to smooth out any residual jaggedness in the outline. In this example, the two shapings differ only in the criteria for winnowing.

Final Results

At this point, after searching and shaping, the search contour accurately describes the outline of the target object as it appears in the search image. This final segmentation contour may now itself be used as a training contour for one or more subsequent search images. If the target object is very similar in all of the search images, there is no advantage in propagating training contours in this fashion, since if an error occurs in a final segmentation contour, the error will be propagated throughout subsequent searches based on that contour. In such a case, it is preferable to use the original training contour for all images. However, if the target object varies appreciably from image to image, using final segmentations as training contours for subsequent search images produces better results, because otherwise, there is essentially a discontinuity between the single original training image and search images that are distant from the training image. These considerations extend in a straightforward fashion to the situation where multiple training contours have been initially provided.

Once all of the images have been searched for the target object, the inventive method is finished. The contours, describing the boundary of the target object as it appears in every image, may be checked and corrected if necessary by the human operator. The contours may not be absolutely perfect. Note that the higher the quality of the data or set of images supplied, and the higher the quality of the training contour(s) supplied, the higher the quality of the output produced.

Supplementary Contour Routines

The following general-use routines may be used in very specific and limited applications. These routines may be used during any point of the entire segmentation process, for example, during shaping, or in-between cycles of gradient search.

Cleaning tendrils (Supplementary)

Figure 17:
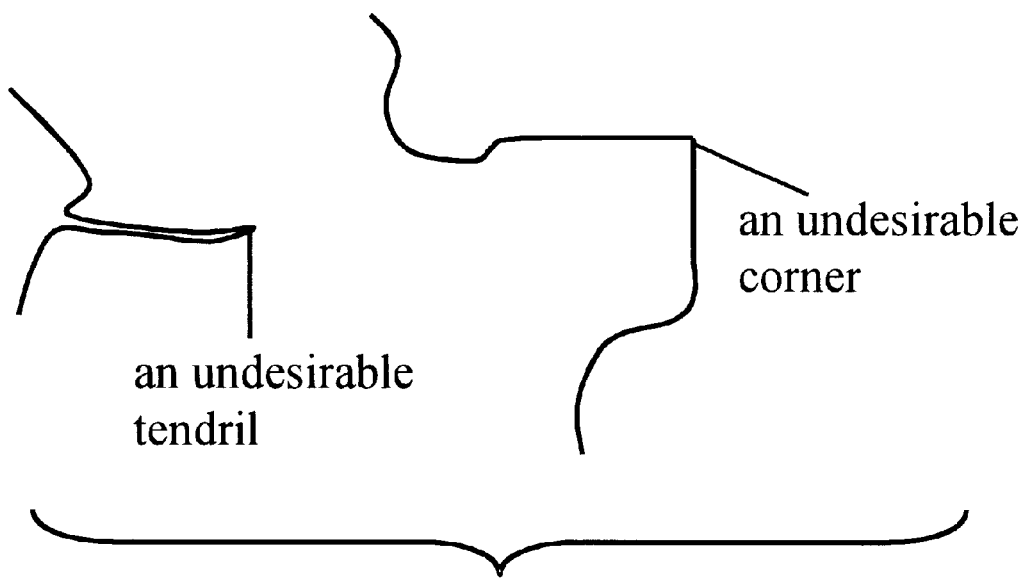
FIG. 17 is a drawing showing a corner and a tendril.

Referring now to FIG. 17, it is not uncommon for a contour to develop thin unwanted tendrils. For example, during a SHRINK phase of gradient search, one or two cracks may happen to erroneously histogram-match at an early point in the processing. As the contour shrinks, thin outgrowths extending to the matching cracks are left behind. An example of such a tendril is shown in the left-hand portion of FIG. 17. The code to "clean" a tendril of a given width is straightforward: at the base of the tendril, perform a series of moves (with complex moves allowed) that move one wall of the tendril closer to the opposing wall. When the walls meet, the tendril automatically pinches off and disappears. It is contemplated that this optional routine is specifically useful in removing unwanted thin or "string-like" details from segmentation contours. For example, this may be useful in removing the optic nerve from brain segmentations.

Cleaning corners (Supplementary)

Occasionally, a contour will form undesirable corners, as shown in the right-hand portion of FIG. 17. Code to smooth these is straightforward, and can be easily implemented by one of ordinary skill in the art. The easiest way is to perform a bunch of simple SHRINK moves along the corner.

Manually Segmented Contours

The present inventive method requires input prior to searching, in the form of one or more training contours. As described above, the training contours provide initial pixel intensity and geometric information. Often, such target contours are manually drawn by the human operator using a mouse or other input device. Alternately, it is possible to maintain libraries of training contours, suitable for specific tasks, to relieve the operator of the burden of constantly drawing manual contours.

The preferred method of inputting a manual contour is as follows:

1) The operator draws a shape upon a 2D image using some input device. For example, the operator may outline a brain as it appears in an image using a mouse or other such device.

2) The interior of the drawn shape is set to black, and the exterior of the drawn shape is set to white. All pixels in the 2D image are now either black or white, depending on whether they lie inside or outside the operator-drawn image. Such a binary 2D image is called a "raster."

3) The cracks that separate black pixels from white pixels are collected into a contour, with care taken to prevent the contour from self-intersecting.

Steps 1 and 2 are easily implemented by someone skilled in the art. Pseudocode for step 3 above is as follows.

Pseudocode to translate a binary raster into a contour:

```
Input: r, a binary raster
if r contains no black pixels, stop execution and return an error message
let (startX,startY) be the (crack) coordinates of the most upper-left black pixel in r
let d be the crack direction RIGHT
let (x,y) equal (startX,startY)
repeat the following bracketed pseudocode until execution stops
    {
        place a crack of direction d at location (x,y)
        let a be the pixel at (pixel) location (x,y)
        let b be the pixel lying immediately adjacent to pixel a, in the direction of d
        let c be the pixel lying immediately diagonal to pixel a and opposite to pixel b
        if c is black then set b to be black
        if c is black then
            let newd=turn_left(d)
        else if b is black then
            let newd=d
        else
            let newd=turn_right(d)
        let (x,y) be the crack pointed to by crack (x,y) with direction d
        let d=newd
        if (x,y) is equal to (startY, startY) then stop execution
    }
```

Hardware

Figure 18A:
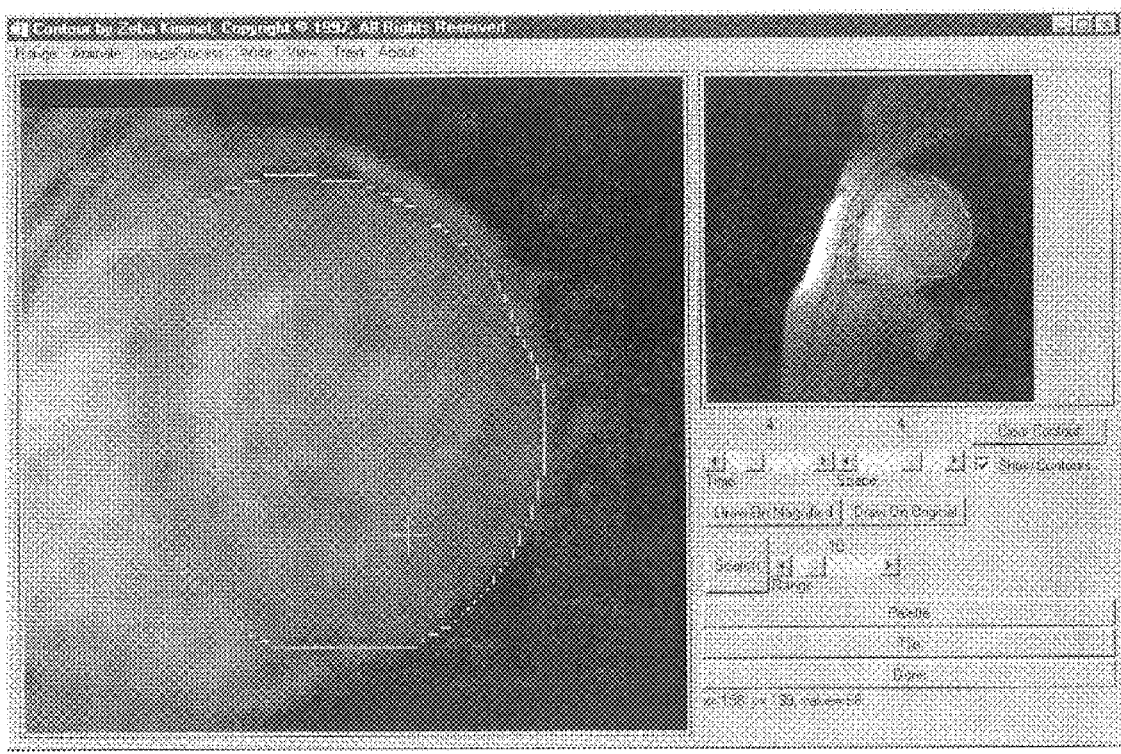
FIG. 18A is a photographic computer image showing the display presented to the user (the "front end") of a specific embodiment of a computer apparatus used to implement the present inventive method.

The above-described method may be implemented, for example, on a personal computer, such as a dual 200MHz Pentium-Pro processor (Intel Corp.) computer manufactured by Micron Inc. The "front end" or display presented to the user by one specific implementation is shown in FIG. 18A. As described above, the operator inputs manual contours by manually drawing contours directly on the images using a mouse or other device.

The present method is implemented in a known digital computer, and preferably uses a standard WINDOWS™ interface to demonstrate the functions described herein. However, any suitable interface or operating system may be used, such as Unix, Microsoft WINDOWS™ 95, WINDOWS™ 3.1, WINDOWS™ NT, IBM OS2™, MACINTOSH OS, and the like, or non-windows operating systems, such as Microsoft DOS.™ Such known digital computers may be IBM compatible computers, Macintosh compatible computers, and the like. However, the present novel method and apparatus is not limited to personal computer type machines and may, for example, be ported to minicomputers and mainframe computers, or placed directly into hardware (chip) form.

Preferably, the software embodied in the novel method and apparatus to perform tasks such as image processing, image display, and manual contouring by the operator, is written and compiled in the IDL programming language, version 5.0.2, provided by Research Systems Inc. The software embodied in the novel method and apparatus to perform tasks such as handling contour movement, searching, and shaping, is preferably written and compiled in Visual C++, Version 5.0, by Microsoft Corp. However, any suitable computer languages and compilers may be used.

Figure 18B:
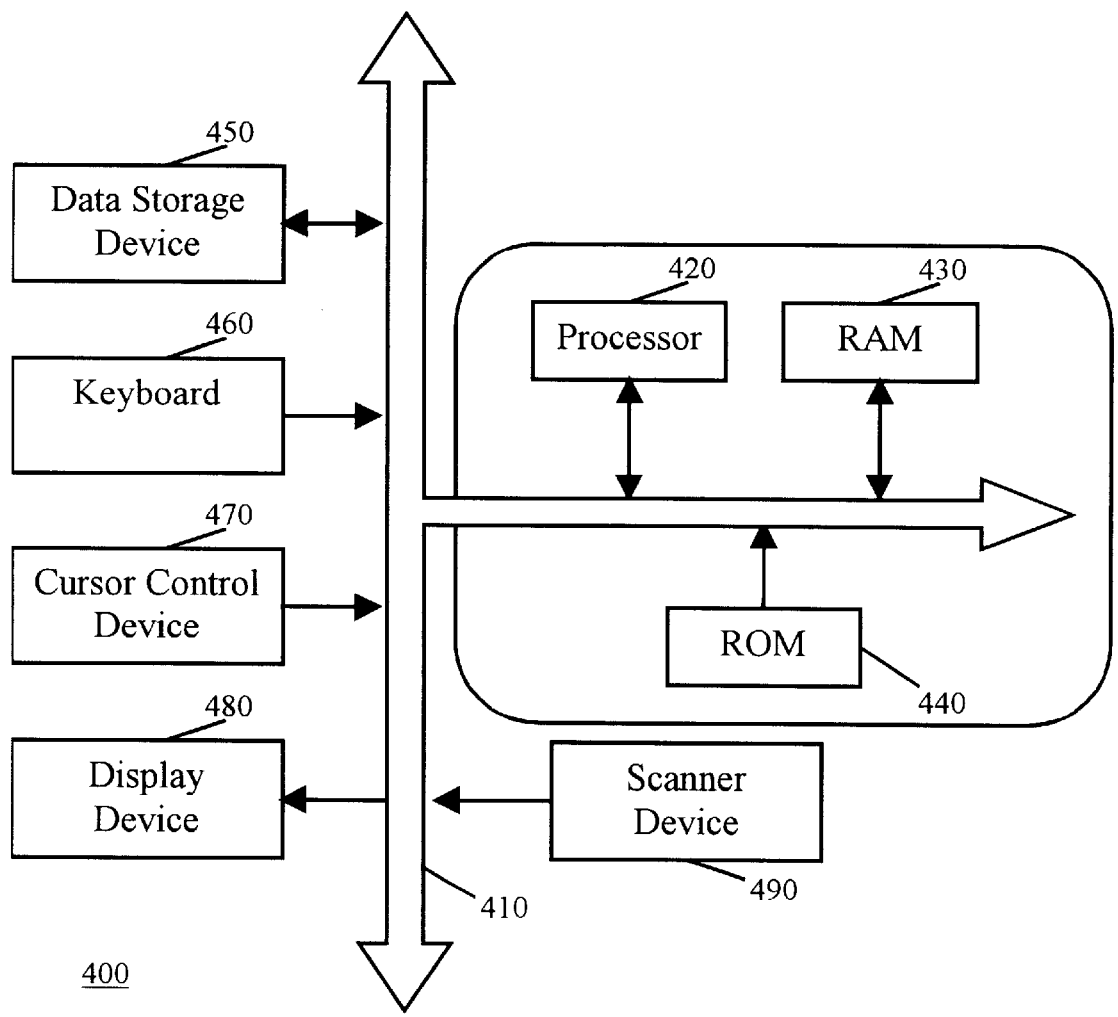
FIG. 18B is a specific illustration of a block diagram of a computer system according to a preferred embodiment of the present invention.

Referring now to FIG. 18B, a block diagram of a known computer system is shown. However, the preferred embodiment may be practiced on computer systems having alternate configurations. FIG. 18B illustrates some of the basic components of such a computer system, but is not meant to exclude other components or to imply that such components are necessarily discreet. The computer system 400 includes a bus or other communication means 410 for communicating information, a processing means 420 coupled to the bus for processing information, a random access memory 430 (RAM), commonly referred to as main memory, coupled to the bus for storing information and instructions for the processor, and a read only memory 440 (ROM) or other static storage device coupled to the bus for storing static information and instructions for the processor.

Other devices coupled to the bus 410 include, for example, a data storage device 450, such as a magnetic or optical disk drive for storing information and instructions, an alpha-numeric input device 460 for communicating information and command selections to the processor 420, a cursor control device 470, such as a mouse, track ball, cursor control keys, and the like, for controlling the cursor and communicating information and command selections to the processor, and a display device 480 for displaying data input and output. A scanner 490 may also be coupled to the computer system 400 through the bus 410.

Experimental Results

Figure 19:
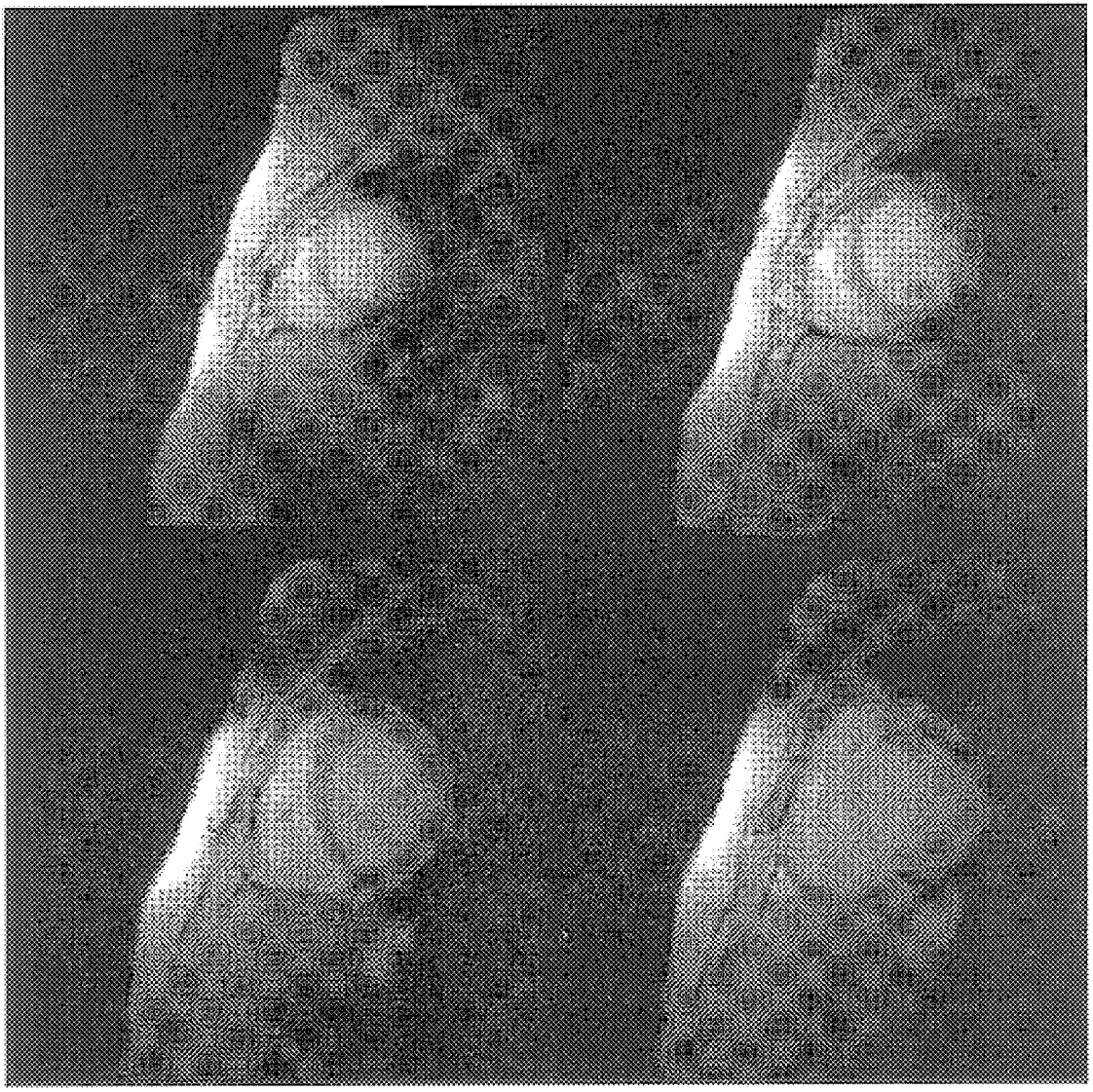
FIG. 19 is a photographic computer image showing four samples from a cardiac MRI data set.

Referring now to FIG. 19, a few images of a cardiac data set are shown. The images represent an anterior oblique view, looking down the bore of the left ventricle[1]. The full data set (not shown) is taken over time (16 samples per physical slice, numbered horizontally as 0 to 15) and space (7 samples over time, numbered vertically as 0 to 6), for a total of 16*7=112 images; close-ups of the full data set are shown in detail in FIG. 20. The target object is the left ventricle epicardial border.

[1]Provided courtesy of Dr. David Levin, M.D., Ph.D, of the University of Chicago.

It is important to realize that the data set used is a real data set. The partial data set shown in FIG. 19 is of poor quality, which is typical. In viewing the images of FIG. 19, the human operator would be unable to identify the actual target border in the images containing smaller views of the ventricle, since the images appear fuzzy. It is common in the prior art to demonstrate the quality of a segmentation method only on artificial problems, such as squares and circles, or to segment only the same image that was used as a training image. The experimental results described herein demonstrate that real-life cardiac data sets of questionable quality are successfully segmented using the present inventive method.

Figure 20:
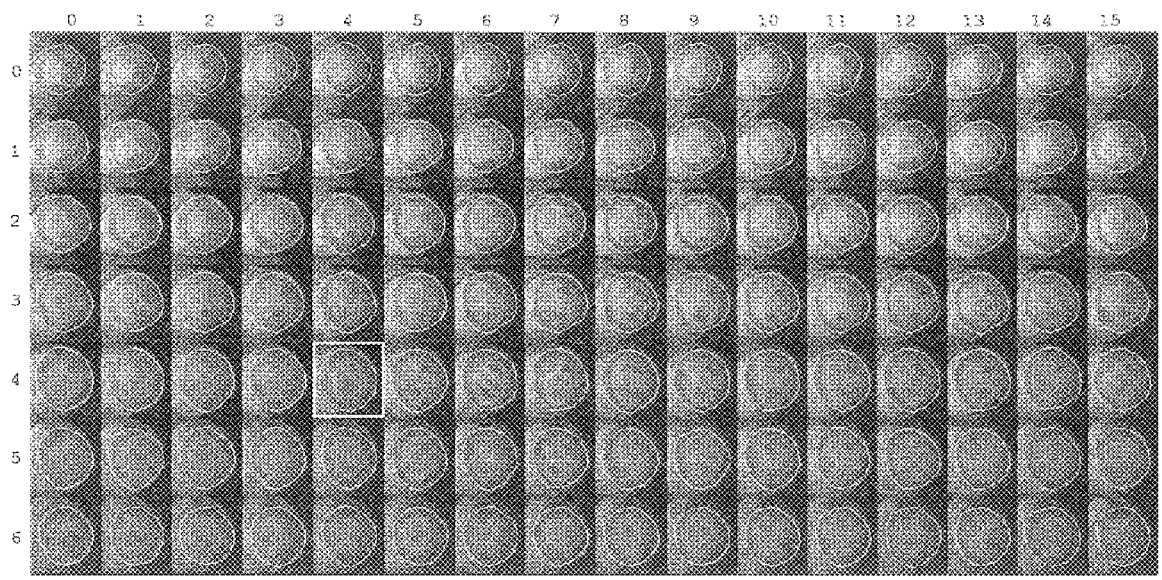
FIG. 20 is a photographic computer image showing experimental results using the cardiac MRI data set of FIG. 19.

Referring now to FIG. 20, the entire data set is shown with the results of segmentation particularly shown as a white outline. In FIG. 20, the first row of 16 images represent space or number 0 (with time increasing from 0 to 15), the second row of 16 images represent space 1, etc. The single image outlined with a white rectangular border shows the only manual segmentation (training contour) at time=4, space=4. Note that this single contour was the only manual input provided. The other 111 images shown in FIG. 20 were all segmented automatically by the present inventive method. Recall that the actual images presented to the present inventive method are similar in appearance and size to the images shown in FIG. 19; the images shown in FIG. 20 are close-ups for enhanced viewability.

In order to remove noise and make the target object (left ventricle epicardial border) more distinct from its surroundings, all images in the data set were processed using standard image processing techniques. First, "thresholding" was used: thresholding set all pixels of pixel intensity values of 20 or less to zero, thus removing low-level noise. Second, "histogram equalization" was used: this redistributed pixel intensity values according to an image-wide histogram of such intensities. The use of the word "histogram" in this section is in accordance with this standard image-processing technique, and is not to be confused with the term "histogram," as used herein with respect to the present invention. Thresholding and histogram equalization are both commonly employed image processing techniques, and they were used here only to remove noise and enhance image quality.

A single training contour was provided by a user, by drawing an outline (using a computer mouse) on a display of the image located at (time=4, space=4). The training contour was used to train throughout space, with training contour propagation, at (time=4). That is, the manual contour (time=4, space=4) was used as the training contour for (time=4, space=3); the resulting segmentation contour at (time=4, space=3) was used as the training contour for (time=4, space=2); and so on. Similarly, the manual contour at (time=4, space=4) was used as the training contour for (time=4, space=5); and the resulting segmentation contour at (time=4, space=5) was used as the training contour for (time=4, space=6). In this way, all of the images for which time=4 were segmented. Training contours were propagated because the target object varied distinctly between space slots, and therefore better results were obtained using training contour propagation.

Details of the search throughout space at time=4 are as follows. All search contours had four segments. Histograms were constructed as follows: 1) I and O were selected by averaging five pixels centered a distance five radial units away from each crack; 2) (I,O) pairs for which $|I-O|<5$, or for which the pixels immediately adjacent to the crack in question differed by less than 5, were not entered into the histograms; 3) blurring used a radius of 20.

In constructing the (I,O) lookup table, I and O were selected by averaging three pixels centered a distance three radial units away from each crack, and since the ventricle lies in the middle of all the images, only pixels in the middle of each image were used to build the (I,O) table. Searching proceeded as follows: 1) defining "len" to be the length of the training contour, 2) each search contour first underwent a SHRINK cycle of (5×len) moves without gradient search, then 3) a GROW cycle of (15×len) moves with gradient search, then 4) a SHRINK cycle of (50×len) moves with gradient search.

During searching, since it was known that the target shape was round, any move that caused a crack to deviate from the average contour radius by more than ten was rejected. The resulting contour was shaped twice. The first shaping used 30 pie slices, and used histogram-matching cracks of maximum radius. The second shaping used 20 pie slices, and used cracks of average radius and angle. In both shapings, before connect-the-dots was performed, cracks that deviated from the average radius of the eight nearest cracks by more than five were first erased (this removed outliers).

At this point, all of the images at time=4 were segmented. These segmentations were now used as training contours, without training contour propagation, for segmentation throughout their respective space slots. For example, the segmentation contour at (time=4, space=2) was used as the training contour for the images at (time=3, space=2), (time=2, space=2), (time=1, space=2), and all other images at space=2. Similarly, the segmentation contour at (time=4, space=6) was used as the training contour for the images at (time=5, space=6), (time=6, space=6), (time=7, space=6), and all other images at space=6. Training contour propagation was not used because all of the images in a particular space slot were very similar, and so superior results were obtained by using only one training contour for all of them.

Details of the search throughout time at the various space values are as follows. All search contours had eight segments. Histograms were constructed as follows: 1) I and O were selected by averaging three pixels centered a distance three radial units away from each crack; 2) (I,O) pairs for which |I−O|<5, or for which the pixels immediately adjacent to the crack in question differed by less than 5, were not entered into the histograms; 3) blurring used a radius of 2.

In constructing the (I,O) lookup table, I and O were selected by averaging three pixels centered a distance three radial units away from each crack, and since the ventricle lies in the middle of all the images, only pixels in the middle of each image were used to build the (I,O) table.

Searching proceeded as follows: 1) defining "len" to be the length of the training contour, 2) each search contour first underwent a SHRINK cycle of (5×len) moves without gradient search, 3) then a GROW cycle of (15×len) moves with gradient search.

During searching, since it was known that the target shape was round, any move that caused a crack to deviate from the average contour radius by more than ten was rejected. The final contour was shaped twice. The first shaping used 30 pie slices, and used histogram-matching cracks of maximum radius. The second shaping used 15 pie slices, and used cracks of average radius and angle. In both shapings, before connect-the-dots was performed, cracks that deviated from the average radius of the eight nearest cracks by more than five were first erased (this removed outliers).

The total time to process all 111 slices (not including image preprocessing) was about 54 seconds, which represents an average of about 0.5 seconds/image. This is extremely fast compared to prior art methods. Also, this search was performed on a dual-Pentium Pro computer, which is not a particularly fast machine.

Note that as one would expect, targets closer to the manually segmented training image are found with higher accuracy. This is because errors propagate because the contours are constantly retrained. If the user requires better results, the user simply provides more manually segmented contours (training contours) to the system.

Domain Modules and Libraries

Note that it is fairly easy to separate a priori problem domain knowledge from search mechanics in the present inventive method. In the case of the left ventricle shown in FIG. 20, we added domain knowledge that the left ventricle is round, by building in heuristics that guided the search contours toward assuming a round form. For example, during searching, such a priori information was added when moves that caused cracks to deviate strongly from the average contour radius were rejected, and in the second shaping, when cracks that caused deviation from a round form were removed by averaging. The underlying mechanics of the program do not depend on any particular heuristics. We could easily build in knowledge that searched for something with straight edges, or a certain area, or a certain polynomial fit, or whatever criteria applied to the task at hand. Alternately, domain knowledge could be ignored and search contours could be permitted to "wander randomly," searching for histogram matches.

Figure 21:
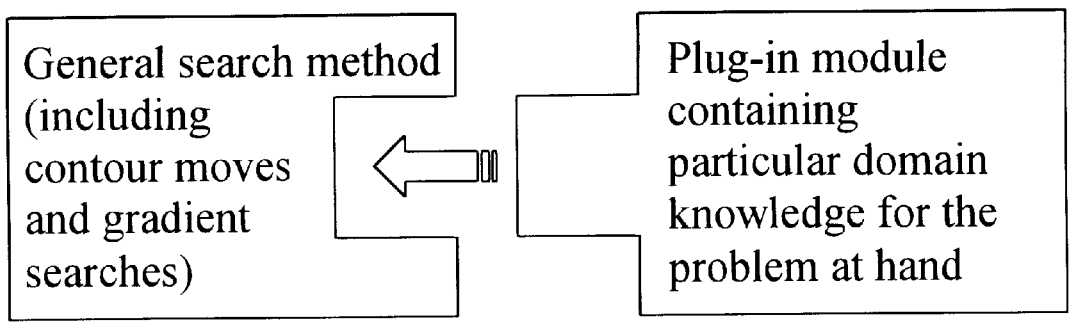
FIG. 21 shows use of a plug-in module for a specific application.

It is contemplated that "domain modules" can be built that embody domain knowledge for different problems. In this scheme, the left ventricle example, the smart missile example, or the satellite tracker example, would each have a domain module that "plugs" into the basic contour search mechanism. This is shown in FIG. 21. Applying the present inventive method to different problems then becomes a simple matter of installing the appropriate domain module. The above scheme rests on the assumption that the search mechanism used in seeking target objects (i.e., simple and complex contour moves, gradient search, shaping) is independent of domain knowledge, but that domain knowledge (i.e., the fact that the left ventricle is round) is important in order to specify search direction. The advantages of the above scheme with respect to "plug in" domain modules is readily apparent. For example, if a researcher needs to segment rat brain slices, he or she would "plug in" or supply a "rat brain module" to the segmenter.

It is also contemplated to build "libraries" of pre-segmented image contours. The present inventive method will then draw on these libraries to guide the segmentation of new data sets, relieving the user of having to provide manual segmentations for each new data set.

It is also readily apparent that the present inventive method provides an extremely fast and accurate segmentation of one or more target objects in many images, and extends across many problem domains.

Specific embodiments of a method and apparatus for segmenting images using constant-time deformable contours according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A method of segmenting a set of images comprising the steps of:
   a) providing a set of search images, each search image containing a view of a target object;
   b) providing a priori domain knowledge corresponding to the set of search images;
   c) selecting a training image from the set of search images;
   d) obtaining at least one training contour from the selected training image, the training contour representing an outline of the target object in the selected training image;
   e) utilizing the selected training contour to extract training information corresponding to the target object in the selected training image;
   f) associating the training contour with a selected search image of the set of images, the training contour defining a search contour;
   g) deforming the search contour relative to the selected search image and maintaining predetermined information corresponding to the deformed search contour;
   h) utilizing the training information and the a priori domain knowledge to identify regions of the deformed search contour that correspond within predetermined limits to an outline of the target object in the selected search image; and
   i) repeating steps (c) through (h) for each image in the set of search images so as to segment all of the images in the set of search images.

2. The method according to claim 1 wherein the step of providing a priori domain information includes providing information in the form of predetermined rules relating to known characteristics corresponding to the search images.

3. The method according to claim 1 wherein at least one of the training contour and the search contour is represented as a plurality of cracks in a list of cracks, each crack representing the space between adjacent pixels of the target object and having an assigned value equal to one of four discrete directions, the direction assigned to each crack indicating a location corresponding to an adjacent crack of the contour, such that the list of cracks define a closed, non-intersecting contour having an interior portion and an exterior portion.

4. The method according to claim 3 wherein the assigned directions "d" of a crack are rotated utilizing the following formulas, said assigned directions being expressed as hexadecimal values of 0xF0, 0xD0, 0xC0, and 0xE0, respectively, the formulas for rotation defined as:
   1) Rightward rotation of a direction of crack by ninety degrees=

(d−0x10)|0xC0;

2) Leftward rotation of a direction of a crack ninety degrees=

(d+0x10)|0xC0;

3) One-hundred and eighty degree rotation of a direction of a crack=

(d^0x20); and where the symbol "|" is equal to the bitwise logical OR operation and the symbol "^" is equal to the bitwise logical exclusive OR (XOR) operation.

5. The method according to claim 1 wherein at least one of the training contour and the search contour is partitioned into a plurality of segments defined by a portion of the contour subtended by an arc formed by rays originating at a centroid of the contour, each arc having equal angular values.

6. The method according to claim 5 wherein each segment has a corresponding histogram representing pixel characteristics of the segment, the pixel characteristics represented as pixel intensity pairs stored in the histogram, each pixel intensity pair corresponding to the intensity of at least one pixel located in the interior portion of the contour and the intensity of at least one pixel located in the exterior portion of the contour, respectively.

7. The method according to claim 6 wherein each pixel intensity pair is generated by averaging values of pixels located within a predetermined distance from the contour and lying along a radius of the contour as defined by its centroid.

8. The method according to claim 6 wherein each pixel intensity pair is used to place related pixel intensity pairs in the histogram, so that the original pixel intensity pair is blurred.

9. The method according to claim 8 wherein each pixel intensity pair is used to place other pixel intensity pairs in the histogram, such that a totality of pairs define a circle centered at the original pixel intensity pair.

10. The method according to claim 6 wherein the histograms corresponding to the search contour are formed as chained hash tables so as to minimize an amount of memory required to contain the pixel intensity pair data for the contour.

11. The method according to claim 6 wherein the pixel intensity pairs corresponding to a plurality of pixels of the search image, relative to the centroid of the training contour, are stored in a look-up table prior to the step of identifying regions of the deformed search contour.

12. The method according to claim 1 wherein the step of deforming the search contour includes the step of performing at least one of a plurality of simple moves and a plurality of complex moves, said moves modifying at least one crack in a list of cracks that represent the search contour.

13. The method according to claim 12 wherein the simple move displaces at least one crack of the search contour from its original position by one crack position, the simple move affecting a maximum of four cracks in the crack list, said simple move occurring in O(1) order of time if the simple move does not shift the centroid of the search contour by more than a predetermined distance.

14. The method according to claim 12 wherein predetermined information corresponding to the search contour is updated after the search contour is deformed, said updating requiring order O(1) time to perform.

15. The method according to claim 12 wherein if the deformation of the search contour causes a centroid of the search contour to be displaced by less than a predetermined number of pixels, the predetermined information corresponding to the search contour is updated and requires order O(1) time to perform the update.

16. The method according to claim 12 wherein if the deformation of the search contour causes a centroid of the search contour to be displaced by more than a predetermined number of pixels, the predetermined information corresponding to the search contour is updated and requires up to order O(n) time to perform the update, and where n is equal to the number of cracks in the search contour.

17. The method according to claim 6 wherein the step of identifying regions of the deformed search contour that correspond to the outline of the target object include the step of determining the amount of overlap between the training contour and the search contour respectively.

18. The method according to claim 17 wherein the step of deforming the search contour is performed by growing and shrinking the search contour according to a predetermined sequence such that deformations that increase the amount of overlap between the training contour and the search contour are accepted, and deformations that decrease the amount of overlap between the training contour and the search contour are rejected.

19. The method according to claim 17 wherein the step of alternating between growing and shrinking permits the deformed search contour to jump out of local minimum conditions.

20. The method according to claim 3 wherein after the search contour is deformed, if a non-closed contour results, cracks within the list of cracks are connected to form a closed non-intersecting contour.

21. The method according to claim 1 wherein multiple training images are utilized to extract the training information.

22. The method according to claim 1 wherein the training contour is provided by a human operator.

23. The method according to claim 1 wherein the training contour is supplied by a predetermined library of training contours corresponding to the set of search images.

24. A method of segmenting a set of images comprising the steps of a) providing a set of search images, each search image containing a view of a target object;

b) providing a priori domain knowledge corresponding to the set of search images;

c) selecting a training image from the set of search images;

d) obtaining a training contour from the selected training image, the training contour representing an outline of the target object in the selected training image;

e) utilizing the selected training contour to extract training information corresponding to the target object in the selected training image;

f) associating the training contour with a selected search image of the set of images, the training contour defining a search contour;

g) deforming the search contour relative to the selected search image and maintaining predetermined information corresponding to the deformed search contour;

h) utilizing the training information and the a priori domain knowledge to identify regions of the deformed search contour that correspond within predetermined limits to an outline of the target object in the selected search image;

i) utilizing selected regions of the search contour and the a priori domain knowledge to fashion a final segmentation contour such that the final segmentation contour forms an outline of the target object in the selected search image; and j) repeating steps (c) through (i) for each image in the set of search images so as to segment all of the images in the set of search images.

\* \* \* \* \*